US012665931B2

(12) United States Patent
Ravi et al.

(10) Patent No.: US 12,665,931 B2
(45) Date of Patent: Jun. 23, 2026

(54) TECHNIQUES FOR DYNAMIC CLIENT-SIDE TRAFFIC ROUTING WITH SERVER-SIDE CONTROL

(71) Applicant: Oracle International Corporation, Redwood Shores, CA (US)

(72) Inventors: Guhan Ravi, Kirkland, WA (US); Neha Gupta, Sammamish, WA (US); Srinivasa Aditya Uppu, Bothell, WA (US); Ravikumar Arunachalam, Marvin, NC (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/599,040

(22) Filed: Mar. 7, 2024

(65) Prior Publication Data

US 2025/0286911 A1 Sep. 11, 2025

(51) Int. Cl.
*H04L 9/40* (2022.01)
*H04L 67/10* (2022.01)

(52) U.S. Cl.
CPC ............ *H04L 63/20* (2013.01); *H04L 63/102* (2013.01); *H04L 67/10* (2013.01)

(58) Field of Classification Search
CPC ........ H04L 63/20; H04L 63/102; H04L 67/10
See application file for complete search history.

(56) References Cited

U.S. PATENT DOCUMENTS 6,078,960 A 6/2000 Ballard
7,188,359 B2 3/2007 Toomey 10,931,544 B2 * 2/2021 Lamba .................. H04L 67/025
11,271,996 B1 3/2022 Cini Sarreo et al.
2006/0074937 A1 4/2006 Bird et al.
(Continued)

FOREIGN PATENT DOCUMENTS

CN 106559450 A 4/2017
IN 2372/CHE/2014 1/2016
WO 03021395 A2 3/2003

OTHER PUBLICATIONS

"DynConD Client-Side Global Server Load Balancer", Available online at: https://www.dyncond.com/, Accessed from internet on Jan. 30, 2024, 4 pages.

(Continued)

*Primary Examiner* — Hua Fan
(74) *Attorney, Agent, or Firm* — Kilpatrick Townsend & Stockton LLP

(57) ABSTRACT

Techniques are disclosed for enabling dynamic routing of identity and access (IA) requests to a cloud identity and access management (IAM) system. In some embodiments, the health (or service quality) of a cloud IAM system is continuously monitored in the background to update routing information for dynamically routing IA requests for client cloud services to the cloud IAM system in the foreground. In some embodiments, background monitoring is performed by sending first-type IA requests to the cloud IAM system to discover traffic patterns. In some embodiments, routing information may be mappings between client cloud services and identity endpoints of service cells in the cloud IAM system with configurable attributes that help rebalance and distribute the IA traffic.

20 Claims, 9 Drawing Sheets

(56) References Cited

U.S. PATENT DOCUMENTS

| | | | | |
|---|---|---|---|---|
| 2012/0102226 A1* | 4/2012 | Hopmann | ........... | H04L 67/1001 |
| | | | | 709/241 |
| 2017/0187820 A1 | 6/2017 | Vangala et al. | | |
| 2018/0295556 A1* | 10/2018 | Baek | ...................... | H04W 8/26 |
| 2023/0401129 A1* | 12/2023 | Chilamakuri | ....... | G06F 11/0709 |

OTHER PUBLICATIONS

"Enhancing ISP Backbone Networks with Global Server Load Balancing (GSLB)", Available online at: https://www.dyncond.com/enhancing-isp-backbone-networks-with-global-server-load-balancing-gslb, Nov. 21, 2023, 3 pages.

"Neo4j Leadership, Routing and Load Balancing", Available online at: https://neo4j.com/docs/operations-manual/current/clustering/setup/routing/#:~: text=Client%2Dside%20routing%20is%20when,are%20sent%20to%20other%20servers, Accessed from internet on Jan. 30, 2024, 2 pages.

"Neo4j Operations Manual", Available online at: https://neo4j.com/docs/operations-manual/current/introduction/, Accessed from internet on Jan. 19, 2024, 5 pages.

"Spring Cloud Netflix", Available online at: https://cloud.spring.io/spring-cloud-static/spring-cloud-netflix/1.3.1.RELEASE/, Accessed from internet on Jan. 30, 2024, pp. 1-41.

"Using DynConD—Implementation for Client-Side Load Balancing", Available online at: https://www.dyncond.com/dyncond-implementation/, Accessed from internet on Jan. 30, 2024, 2 pages.

Wee et al., "Client-Side Load Balancer using Cloud", Available online at: https://dl.acm.org/doi/abs/10.1145/1774088.1774173, Mar. 22, 2010, pp. 399-405.

* cited by examiner

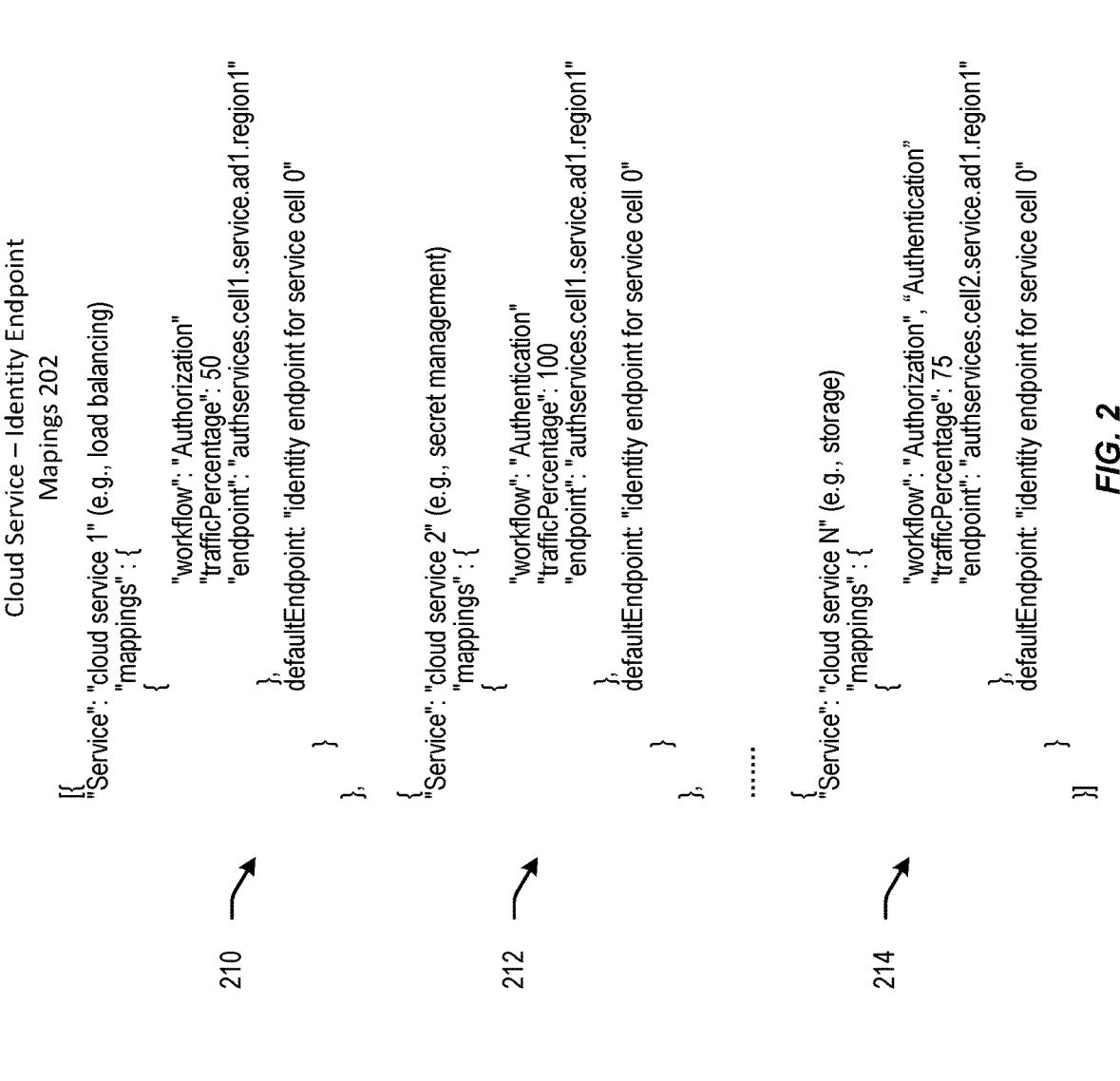

Cloud Service – Identity Endpoint
Mappings 202

```
[{
"Service": "cloud service 1" (e.g., load balancing)
    "mappings" : {
        {
        "workflow": "Authorization"
        "trafficPercentage": 50
        "endpoint": "authservices.cell1.service.ad1.region1"
        },
        defaultEndpoint: "identity endpoint for service cell 0"
    }
},
{
"Service": "cloud service 2" (e.g., secret management)
    "mappings" : {
        {
        "workflow": "Authentication"
        "trafficPercentage": 100
        "endpoint": "authservices.cell1.service.ad1.region1"
        },
        defaultEndpoint: "identity endpoint for service cell 0"
    }
},
......
{
"Service": "cloud service N" (e.g., storage)
    "mappings" : {
        {
        "workflow": "Authorization" , "Authentication"
        "trafficPercentage": 75
        "endpoint": "authservices.cell2.service.ad1.region1"
        },
        defaultEndpoint: "identity endpoint for service cell 0"
    }
}]
```

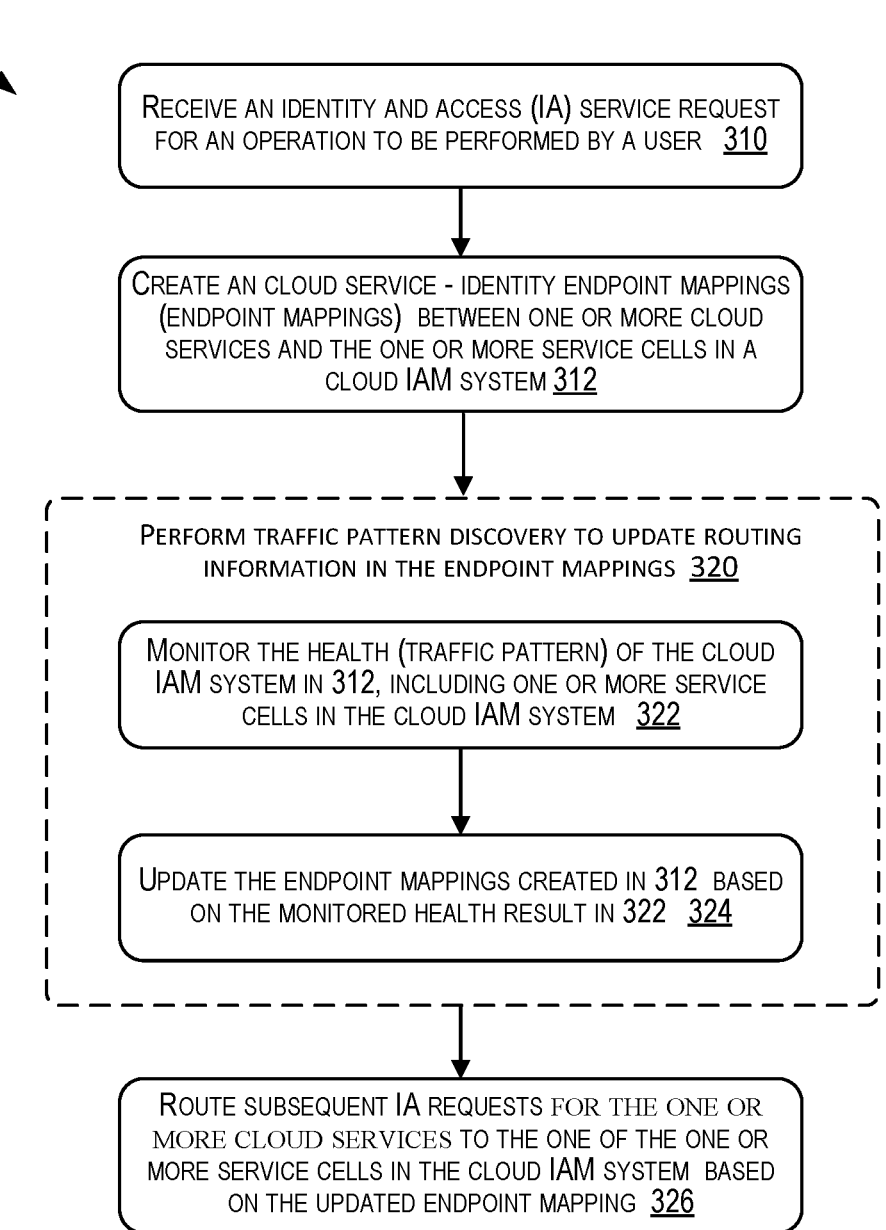

RECEIVE AN IDENTITY AND ACCESS (IA) SERVICE REQUEST FOR AN OPERATION TO BE PERFORMED BY A USER 310

CREATE AN CLOUD SERVICE - IDENTITY ENDPOINT MAPPINGS (ENDPOINT MAPPINGS) BETWEEN ONE OR MORE CLOUD SERVICES AND THE ONE OR MORE SERVICE CELLS IN A CLOUD IAM SYSTEM 312

PERFORM TRAFFIC PATTERN DISCOVERY TO UPDATE ROUTING INFORMATION IN THE ENDPOINT MAPPINGS 320

MONITOR THE HEALTH (TRAFFIC PATTERN) OF THE CLOUD IAM SYSTEM IN 312, INCLUDING ONE OR MORE SERVICE CELLS IN THE CLOUD IAM SYSTEM 322

UPDATE THE ENDPOINT MAPPINGS CREATED IN 312 BASED ON THE MONITORED HEALTH RESULT IN 322 324

ROUTE SUBSEQUENT IA REQUESTS FOR THE ONE OR MORE CLOUD SERVICES TO THE ONE OF THE ONE OR MORE SERVICE CELLS IN THE CLOUD IAM SYSTEM BASED ON THE UPDATED ENDPOINT MAPPING 326

From 312

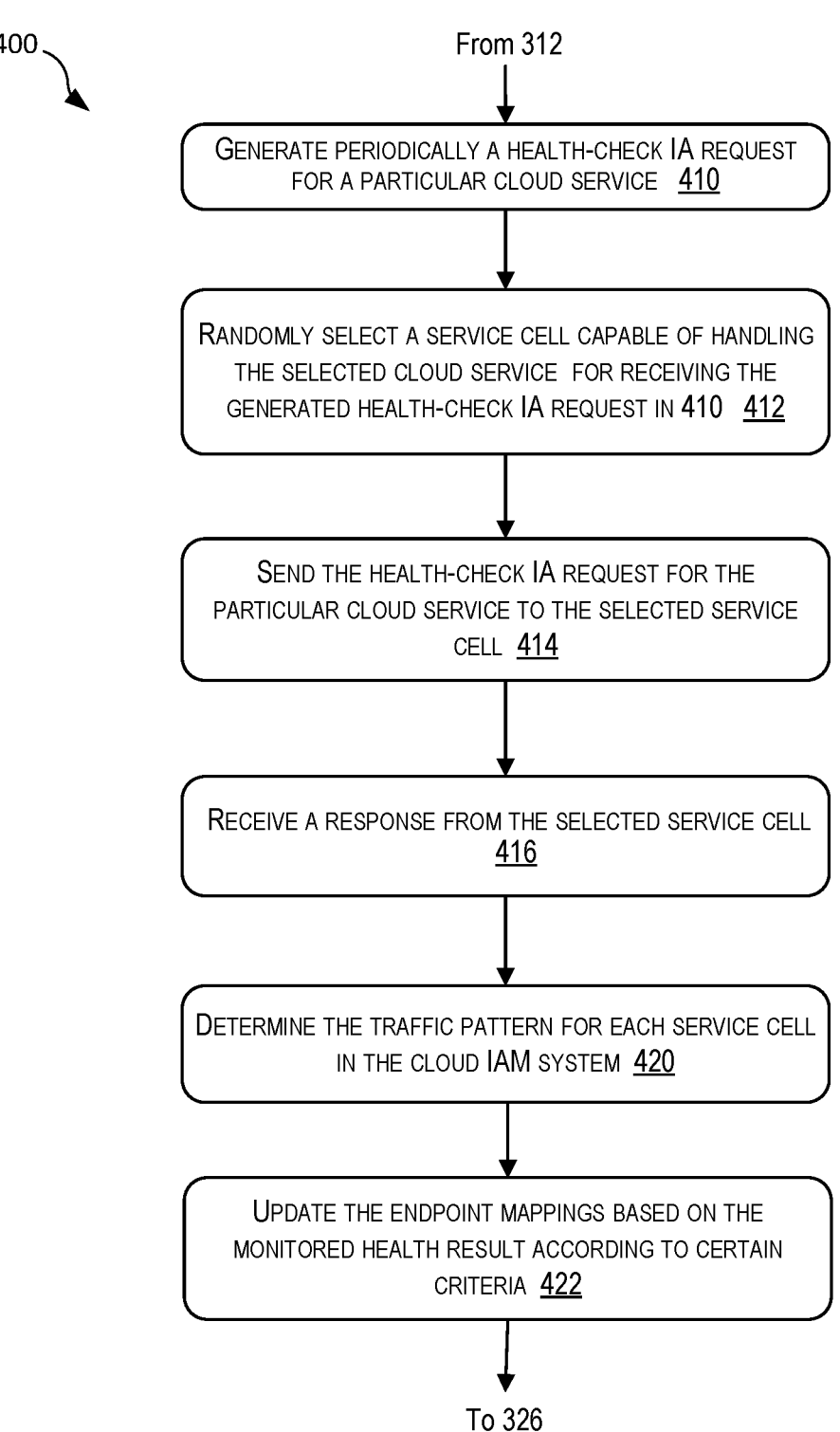

GENERATE PERIODICALLY A HEALTH-CHECK IA REQUEST FOR A PARTICULAR CLOUD SERVICE  410

RANDOMLY SELECT A SERVICE CELL CAPABLE OF HANDLING THE SELECTED CLOUD SERVICE  FOR RECEIVING THE GENERATED HEALTH-CHECK IA REQUEST IN 410  412

SEND THE HEALTH-CHECK IA REQUEST FOR THE PARTICULAR CLOUD SERVICE TO THE SELECTED SERVICE CELL  414

RECEIVE A RESPONSE FROM THE SELECTED SERVICE CELL  416

DETERMINE THE TRAFFIC PATTERN FOR EACH SERVICE CELL IN THE CLOUD IAM SYSTEM  420

UPDATE THE ENDPOINT MAPPINGS BASED ON THE MONITORED HEALTH RESULT ACCORDING TO CERTAIN CRITERIA  422

TECHNIQUES FOR DYNAMIC CLIENT-SIDE TRAFFIC ROUTING WITH SERVER-SIDE CONTROL

FIELD

The present disclosure generally relates to techniques for providing cloud services. More specifically, techniques are disclosed for enabling dynamic routing of identity and access (IA) request routing to a cloud identity and access management (IAM) system.

BACKGROUND

Identity and access management (IAM) is integral to cloud services. As cloud computing becomes more prevalent, customers and users of the customers can access data and share data from anywhere in the "cloud." However, IAM plays an important role to ensure the right persons can access the data they need and have the proper security clearance.

BRIEF SUMMARY

The present disclosure generally relates to techniques for providing cloud services. More specifically, techniques are disclosed for enabling dynamic routing of identity and access (IA) requests to a cloud identity and access management (IAM) system. Various embodiments are described herein, including methods, systems, non-transitory computer-readable storage media storing programs, code, or instructions executable by one or more processors, and the like.

In certain embodiments, techniques are provided including a method that comprises monitoring, by a computing system, health of an identity management service that comprises a set of identity service cells, the monitoring comprising sending a first-type identity and access (IA) service request to one of the set of identity service cells; creating, by the computing system, routing information associated with a first client cloud service and a first identity service cell of the set of identity service cells, the first client cloud service being one of a set of client cloud services provided by a cloud service provider (CSP); updating, by the computing system, the routing information based at least in part on the monitored health of the identity management service; and routing, by the computing system, a second-type IA service request by the first client cloud service to a first identity service cell of the set of identity service cells based at least in part on the routing information associated with the first client cloud service and the first identity service cell of the set of identity service cells.

In yet another embodiment, sending the first-type IA service request to one of the set of identity service cells and routing the second-type IA service request are performed in parallel.

In yet another embodiment, each of the set of identity service cells comprises at least a host machine.

In yet another embodiment, the method further comprises generating the first-type IA service request periodically for a randomly selected client cloud service of the set of client cloud services provided by the CSP.

In yet another embodiment, the first-type IA service request for the randomly selected client cloud service invokes a response from the identity management service without performing an identity management function for the randomly selected client cloud service.

In yet another embodiment, the second-type IA service request by the first client cloud service invokes a response from the identity management service and an identity management function for the first client cloud service.

In yet another embodiment, the routing information associated with the first client cloud service and the first identity service cell of the set of identity service cells is a mapping between the first client cloud service and a service endpoint of the first identity service cell.

In yet another embodiment, the routing information further comprising a mapping between the first client cloud service and a service endpoint of a second identity service cell of the set of identity service cells.

In yet another embodiment, the method further comprises routing the second-type IA service request by the first client cloud service to a second service cell of the set of identity service cells instead when the first identity service cell is determined to be in an unhealthy condition.

In yet another embodiment, the routing information further comprising one or more attributes related to the health of the first identity service cell of the set of identity service cells.

In yet another embodiment, the one or more attributes comprises at least one of a utilization rate threshold, and an identity management function.

In yet another embodiment, the routing information is updated by following a configurable priority scheme.

In various embodiments, a system is provided that includes one or more data processors and a non-transitory computer readable medium containing instructions which, when executed on the one or more data processors, cause the one or more data processors to perform part or all of one or more methods disclosed herein.

In various embodiments, a non-transitory computer-readable medium, storing computer-executable instructions which, when executed by one or more processors, cause the one or more processors of a computer system to perform one or more methods disclosed herein.

BRIEF DESCRIPTION OF THE DRAWINGS

FIG. 2 illustrates an example endpoint mapping format used in the example architecture in FIG. 1 for dynamically routing dynamic identity and access (IA) service requests, according to certain embodiments.

FIG. 3 illustrates a simplified flowchart depicting a method for dynamically routing identity and access (IA) service requests, according to certain embodiments.

FIG. 4 illustrates a flowchart depicting a method for discovery service and updating routing information in the cloud service-identity endpoint mappings, according to certain embodiments.

DETAILED DESCRIPTION

Figure 1:
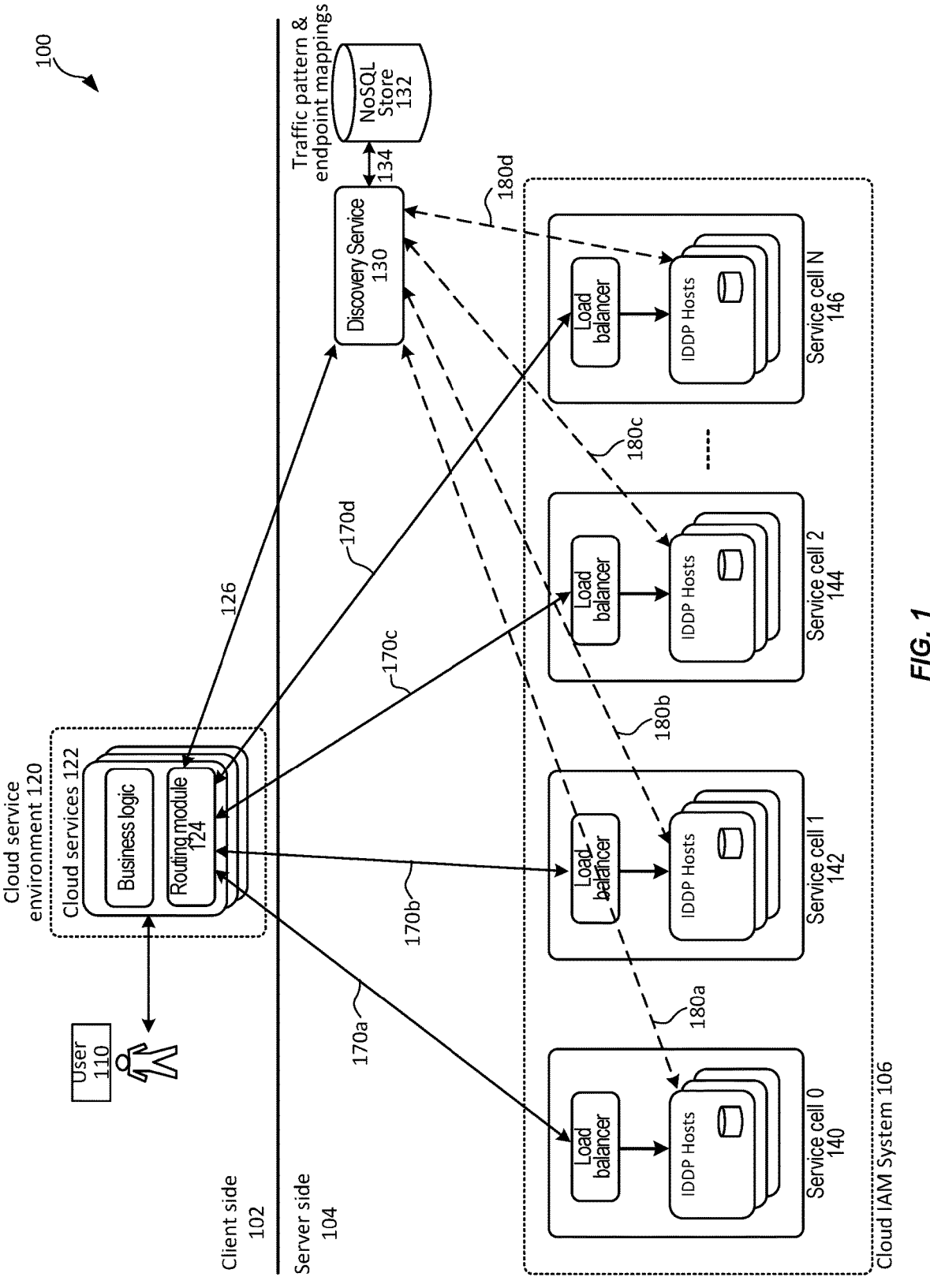
FIG. 1 is a block diagram illustrating an example architecture for dynamically routing identity and access (IA) service request to a cloud IAM system, according to certain embodiments.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

For the purpose of the present disclosure, a cloud identity and access management (IAM) system may include a control plane (CP) and a data plane (DP). The control plane further includes two control plane services, namely identity cloud service (IDCS) and identity control plane (IDCP). IDCS is responsible for the creation, read, update, and deletion (CRUD) operations for identity entities like users, groups, group membership, etc. (collectively called domains corpus). IDCP is responsible for the CRUD operations on the IAM policies of cloud infrastructure tenancies, where the policies are referred to as policy corpus. The identity data plane (IDDP) provides authentication and authorization functionalities for IAM customers (or clients), which are typically other cloud infrastructure services (referred to herein as cloud services (or client cloud services to denote as clients to IAM), such as storage service, compute service, etc.).

Identity and access management (IAM) may be referred to herein as identity management (or identity management service). The functions (e.g., authentication, authorization, user management, etc.) that the IAM performs may be referred to herein as identity management functions (or called identity check). An identity and access (IA) service request (or referred to as IA request) from a client cloud service to a cloud IAM system is a request for the cloud IAM system to perform identity management functions for that cloud service (i.e., a client of the IAM system). Both the client cloud services and IAM service may be provided by a cloud service provider (CSP).

Between the IDCP and IDDP, the availability requirements for IDDP are much higher compared to the availability requirements for the control plane because IDDP may be used by almost all services in a cloud infrastructure. For example, in a cloud infrastructure, every action may need to be authorized. The identity of each user may need to be verified. Each instance or object may need to be authenticated. On the other hand, the creation, update, and deletion of a user's account and customer's tenancies may occur occasionally.

A cloud IAM system may have a service cell architecture, where IDDP comprises a set of service cells (i.e., one or more service cells). In the context of IAM, a service cell (also referred to as an identity service cell) in the IDDP may refer to a self-sufficient single unit of service that services a single or a subset of customers (or clients). The service request may be initiated by a client of the IAM. A client of the IAM sending an IA request to a service cell in the IDDP may be a cloud service (e.g., OCI cloud infrastructure service), such as an object storage service or a compute service, that needs authentication and authorization. For example, for an object storage service, when a user uploads an object to object storage, the object storage service (i.e., a client of the IAM) may need to request permission from a particular service cell in the IDDP to allow the user to upload the object. If the particular service cell in the IDDP is overloaded, under stress, or experiencing an outage, the performance and availability of the object storage service may be impacted.

In the context of the cloud, a realm refers to a logical collection of one or more regions. Realms are typically isolated from each other and do not share data. A "region," in certain embodiments, may refer to a logical abstraction corresponding to a geographic area. Each region can include one or more connected data centers. Regions are independent of other regions and can be separated by vast distances. Within a region, the data centers in the region may be organized into one or more availability domains (ADs). Availability domains are isolated from each other, fault-tolerant, and very unlikely to fail simultaneously. ADs are configured such that a failure at one AD within a region is unlikely to impact the availability of the other ADs within the same region.

IAM plays an important role in a cloud infrastructure because many cloud services depend on identity management to provide authentication and authorization. The identity data plane (IDDP) of IAM handles all identity and access (IA) service requests for authentication and authorization, and thus is critical and needs to have high availability.

A service cell architecture that has hardcoded endpoints of the service cells in the architecture, where a particular cloud service request can only be sent to a particular service cell regardless of the health of that particular service cell, may not be able to react to degraded performance of the particular service cell and in turn, affect the availability of the particular cloud service. For example, assuming a particular cloud service (e.g., logging service) on the client side is connected to (or is restricted to sending IA requests to) a particular service cell on the server side handling the logging service. When that particular service cell is under stress, it is very hard to direct or move the logging service to a different service cell. The client-side may need to perform some reconfigurations on its machines to resolve the issue. As another example, when one or more customers' traffic has either degraded the latency or caused an outage in a region, a small cloud service with sufficient, but not significant, traffic volume can impact other important or critical cloud services, such as load balancing service, deployment service, deployment orchestrator, and secrets manager. Thus, there is a need to address these challenges and others.

The techniques disclosed in the present disclosure enable dynamic traffic routing functionality/capability of identity and access (IA) service requests for client cloud services, while the determination of the traffic routing is based on the health (or service quality) of a cloud IAM system on the server side. An IA request can be dynamically routed to different service cells in IDDP depending on the types of client cloud services requesting the identity check and the capacity of each service cell. The term dynamic routing may refer herein to routing IA traffic (e.g., IA requests) not to fixed destinations but to changing destinations depending on various conditions (e.g., the health condition of the IAM system).

In some embodiments, the dynamic traffic routing functionality is provided by a discovery service and dynamically updated cloud service-identity endpoint mappings (referred to herein as endpoint mappings). The endpoint mappings are periodically updated based on the traffic pattern information (or result) obtained by the discovery service. The discovery service performs traffic pattern discovery on the server side (e.g., IDDP) by periodically sending an IA service request for a randomly selected client cloud service to a randomly selected service cell capable of handling the selected client cloud service and receiving a response. Such a discovery process can identify the availability and capacity of each service cell, and is performed as a background process. In some embodiments, the IA service request sent by the discovery service is a health-check IA service request (also referred to as a first-type service request) not for invoking identity management functions.

In certain embodiments, the discovered traffic pattern information may be used to create and update a traffic pattern/partition record. Endpoint mappings are also created and updated by the discovery service that provides the routing information for routing/directing a particular type of client cloud service, sending normal IA requests (also referred to as a second-type service request) to different service cells dynamically. Both the traffic pattern/partition record and the endpoint mappings may be stored in a NoSQL storage, and used to dynamically route IA requests to service cells in the cloud IAM system in real time. In some embodiments, the information in traffic pattern/partition record and endpoint mappings may be combined into one record.

In some embodiments, each mapping group of the endpoint mappings may include a client cloud service that is mapped to one or more identity endpoints of service cells, and configurable attributes that help rebalance and distribute the IA traffic, initiated by the client cloud service, among the one or more receiving service cells. In certain embodiments, updates to the endpoint mappings may be performed based on certain criteria (e.g., a configurable priority scheme) to achieve the highest availability for important services.

The techniques disclosed in the present disclosure provide several technical advantages. For example, the dynamic routing of IA service requests is performed on the client side (e.g., client cloud service environment) based on the routing information in the endpoint mappings created by the discovery service, while the routing information in the endpoint mappings is updated based on the real-time health condition of the server-side (e.g., cloud IAM system). Thus, the traffic routing is performed on the client side but how to route the traffic is controlled by the server side (i.e., determined by the health condition/service quality of the server side). Such techniques provide a decentralized decision making for routing.

In addition, the client cloud services and the discovery service operate in parallel and independently. As a result, the techniques do not incur additional latency to the normal IA requests for the client cloud services or impact the performance of the client cloud services.

Finally, the techniques can help achieve high availability of client cloud services based on configurable criteria and priorities for update by rebalancing traffic to different service cells through various adjustable attributes in the endpoint mappings.

Dynamic Routing of Identity and Access Service Requests to a Cloud IAM System

FIG. 1 is a block diagram illustrating an example architecture for dynamically routing identity and access (IA) service request to a cloud IAM system, according to certain embodiments. The distributed environment 100 depicted in FIG. 1 is merely an example and is not intended to unduly limit the scope of claimed embodiments. Many variations, alternatives, and modifications are possible. For example, in some implementations, distributed environment 100 may have more or fewer systems or components than those shown in FIG. 1, may combine two or more systems, or may have a different configuration or arrangement of systems. The systems, subsystems, and other components depicted in FIG. 1 may be implemented in software (e.g., code, instructions, program) executed by one or more processing units (e.g., processors, cores) of the respective systems, using hardware, or combinations thereof. The software may be stored on a non-transitory storage medium (e.g., on a memory device).

As shown in FIG. 1, the distributed system 100 in a region has a client and server sides. The client side 102 may include a user 110, and a cloud service environment 120. The cloud service environment 120 may further include one or more cloud services (e.g., compute service, object storage service, secrets management service, etc.) 122. Each cloud service may include a business logic and a routing module 124. The user 110 may be a person associated with a customer of a cloud service provider (CSP) providing cloud infrastructure services, or an internal user of CSP.

The server side 104 may include IDDP, as part of a cloud IAM system 106, comprising one or more service cells (called cellular fleet), such as service cell 0 140, service cell 1 142, service cell 2 144, and service cell N 146, providing identity management service to the one or more cloud services 122. Each service cell may further comprise a load balancer and IDDP hosts (e.g., a fleet of host machines), where the load balancer can distribute loads to the IDDP hosts within that service cell. The server side may further include a discovery service 130, and NoSQL storage 132.

In some embodiments, each service cell in the cloud IAM system has an identity service endpoint (also referred to as identity endpoint or endpoint). An identity endpoint may be an URL with an associated fully qualified domain name (FQDN) that is used to access the identity management service provided by the cloud IAM system. A set of APIs can be accessed by users associated with customers of the CSP using a set of endpoints. For example, an endpoint associated with service cell 1 may be a URL, such as authservices.cell1.service.ad1.region1, for authorization and authentication service(s) provided by service cell 1 containing a host fleet located in region 1 in availability domain (ad1). In certain embodiments, authorization service and authentication may have separate endpoint URLs, for example, authorization.cell1.service.ad1.region1 for authorization service, and authentication.cell1.service.ad1.region1 for authentication service.

In FIG. 1, a cloud service environment 120 may have cloud services 122, where each cloud service may include a routing module 124. In some embodiments, a routing module may be shared by many cloud services. The cloud services 122 provide cloud services to a user 110 associated with a customer of a CSP. However, before the CSP provides a cloud service (e.g., a compute service) to the requesting user, the cloud service (or client cloud service), as a client/customer of the IAM, may request cloud IAM system 106 to perform identify management functions (e.g., authentication and authorization). Once the identity of the requesting user is verified/authenticated and authorized to access the cloud service, the cloud service may perform the requested operations (e.g., launch a virtual machine) for the user associated with the CSP's customer.

In some embodiments, a routing module 124 may be responsible for routing the IA request to an appropriate service cell that can handle the cloud service type. For example, service cell 1 142 may be configured to handle identity management functions (e.g., authentication and authorization) for a set of cloud service types (e.g., compute service, storage service). Service cell 2 144 may be configured to handle identity check for another set of cloud service types (e.g., deployment service and logging service). In such cases, a user's request to use the compute service may trigger the compute service to request identity check from service cell 1 142 through route 170b of the cloud IAM system 106. In certain embodiments, one of the service cells in the cloud IAM system 106 may be configured as a default cell that can handle all cloud services (i.e., service types) and act as a fallback for other service cells.

In FIG. 1, a discovery service 130 may monitor the health of the cloud IAM system 106 in the background. In other words, the discovery service 130 performs the discovery of endpoint traffic of each service cell periodically (e.g., every five minutes or a time duration suitable for identifying traffic changes), through routes 180a-180d, directly to IDDP hosts to identify the availability and capacity of each service cell. The background discovery process may not affect the normal identity management service process (e.g., normal IA requests through routes 170a-170d).

Compared to normal IA requests sent by client cloud services 122, the discovery service 130 may send health-check (or first-type) IA requests (e.g., 180a-180d) for the purpose of discovering the traffic pattern (or health) of service cells. The health-check IA requests do not invoke identity management functions performed by IAM for the client cloud services or lead to normal operations of cloud services on the client side. For example, a normal IA (or second-type) request sent by a compute service can invoke the IAM system 106 to check the identity of a user requesting the compute service. Upon a successful identity check, an operation (e.g., launching a VM) may be performed. On the other hand, a health-check IA request sent by the discovery service 130 does not invoke an identity check by the IAM system. However, a service cell receiving both the normal IA request and the health-check IA request may generate responses. The response for the normal IA request may be a successful or failed identity check. The response for the health-check IA request may be an acknowledgment of receiving the request. In some further embodiments, health-check IA requests may also test functionality, reachability, utilization rate of the service cells, etc.

In certain embodiments, the discovery service may send normal IA requests to service cells of the cloud IAM system to check if the receiving service cells are still available for performing identity management functions in addition to merely acknowledging the requests. But no operation of any cloud service is performed. However, the traffic for discovery purposes is much lower than the normal traffic from cloud service 122.

As shown in FIG. 1, the health-check (or first-type) IA requests (e.g., 180a-180d) are sent directly to all IDDP hosts in a service cell rather than to the load balancer in that service cell such that the discovery service can obtain the health status of each IDDP host to aggregate the health of the whole service cell. Health discovery traffic sent to the load balancer in a service cell may obtain the health status of only a subset of the IDDP hosts that are considered to have less load by the load balancer.

In certain embodiments, the health of each service cell may include, but not be limited to, utilization rate (e.g., % of utilization of the capacity of each service cell), congestion conditions (e.g., latency, throughput, request traffic, etc. based on the delay of the response) and communication problems (e.g., service availability or errors). For example, a utilization rate may be determined by how many machines are utilized out of the total number of available host machines for that service cell, such as 30% when three out of ten host machines are occupied, or by the current amount of traffic divided by total traffic the host machines of the service cell can handle. A congestion condition, for example, may be determined by how many client cloud services are sending IA requests to a particular service cell.

In some embodiments, when a cloud service is offered or activated in the CSP infrastructure, the cloud service may initialize an authentication/authorization (AuthN/Z) call through a client software development kit (SDK) to the discovery service and invoke a background discovery job for that cloud service. The discovery service 130 may periodically send an unbiased IA request, for example, sending a health-check IA request for a randomly selected cloud service (or cloud service type) to a service cell capable of handling that selected cloud service. In other embodiments, if more than one service cell can handle the selected cloud service, one of the service cells may be randomly chosen to receive the health-check IA request. In further embodiments, the unbiased IA request for the selected cloud service may be sent to all service cells capable of handling that selected cloud service, instead of sending to a randomly chosen one.

For example, a CSP may offer various cloud services, such as compute service, storage service, logging service, deployment service, secrete management service, etc. For a first discovery, the discovery service may randomly select a cloud service (e.g., logging service) among the available services. Suppose service cell 0 140 and service cell 2 144 can handle the logging service type of cloud service. The discovery service may randomly choose between service cell 0 and service cell 2 for discovery to monitor its health (or traffic pattern), and send an IA request for the logging service to the chosen service cell (e.g., service cell 2) via route 180c. Once the discovery service receives a response from service cell 2, either successfully or with an error, the discovery service may create a traffic pattern/partition record to include the obtained health (or traffic) condition of service cell 2. In some embodiments, the traffic pattern/partition record may include service cells in IDDP and their corresponding health/traffic condition (e.g., utilization rate, congestion conditions, and communication problems), as mentioned above, and other relevant information. As a simplified example, the information in the traffic pattern/partition record can be the following:

Cell 0: utilization rate (30%); response time (10 ns); availability (Yes); . . . .

Cell 1: utilization rate (45%); response time (30 ns); availability (Yes); . . .

Cell 2: utilization rate (N/A); response time (N/A); availability (No); . . .

Cell N: utilization rate (70%); response time (100 ns); availability (Yes); . . .

Continuing with the above example, for a second discovery, the discovery service may randomly select another cloud service (e.g., storage service). Suppose service cell 0 140 and service cell 1 142 can handle the storage service type of cloud service. The discovery service may again randomly choose between service cell 0 and service cell 1 for discovery, and send an IA request for the storage service to the chosen service cell (e.g., service cell 0) via route 180a. Once the discovery service receives a response from service cell 0, either successfully or with an error, the discovery service may add the obtained health (or traffic) condition to the traffic pattern/partition record.

Further continuing with the above example, assuming a new cloud service, such as load-balancing service, is offered by the CSP. The new service may notify (e.g., through 126) the discovery service to include the health or traffic pattern discovery for the new service in the future. Each new client cloud service may register with IDDP when it is offered by the CSP by enrolling its service certificate.

FIG. 2 illustrates an example endpoint mapping format used in the example architecture in FIG. 1 for dynamically routing dynamic identity and access (IA) service requests, according to certain embodiments. As discussed above, once discovery service 130 has obtained the health (or traffic pattern) of a service cell and updated the traffic pattern/partition record, it may create and update cloud service-identity endpoint mappings (i.e., endpoint mappings) stored in a NoSQL store 132 residing on the client side 102. A NoSQL store may be a non-relational database. The end-point mappings may be used by the routing module 124 in each client cloud service (e.g., 122) of the cloud service environment 120 to route the IA requests for various cloud services. The routing module 124 of a cloud service may access the information in NoSQL 132 (storing both the traffic pattern/partition record and endpoint mappings) through the discovery service 130 via paths 126 and then 132 by providing the cloud service name of the requesting cloud service to perform a lookup. The information in the endpoint mappings may be stored in a JSON format. In some embodiments, the information may be stored in different formats, such as tables, arrays, key-value stores, XML, and the like. In certain embodiments, the information in traffic pattern/partition record and endpoint mappings may be combined into one record.

As shown in FIG. 2, the endpoint mappings (including routing information) may include multiple mapping groups, each mapping group for a cloud service. For example, in FIG. 2, there are three mapping groups, 210 for cloud service 1, 212 for cloud service 2, and 214 for cloud service N. Each group may include the fields (or attributes), but is not limited to, the source of an IA request (e.g., the requesting cloud service, such as compute service, load balancing service, etc.), type of workflow for the IA request (e.g., authorization or authentication), allowed traffic volume or utilization rate threshold (e.g., % of capacity) for a destination service cell (e.g., identity endpoint URL), and one or more alternative destination service cells.

For example, the first mapping group 210 has the source of an IA request as load balancing cloud service. This load balancing service is mapped to identity endpoint of service cell 1, represented by a URL, "authservices.cell1.service.ad1.region1." The type of work-flow to be handled by service cell 1 for load balancing cloud service is authorization. In some embodiments, multiple types of workflow may be handled by a service cell, such as authorization and authentication. The traffic threshold for service cell 1 is 50% of its capacity. If traffic (e.g., IA request traffic) to service cell 1 exceeds the threshold or a failure occurs (both may be referred to as an unhealthy condition), an alternative or default identity endpoint is service cell 0, represented by "authservices.cell0.service.ad1.region1." In some embodiments, one or more alternative identity end-points other than service cell 0 may be listed in group 210, provided that these one or more alternative endpoints can handle load balancing service.

The second mapping group 212 has the source of an IA request as secret management cloud service. This secret management service is also mapped to identity endpoint of service cell 1, represented by a URL, "authservices.cell1.service.ad1.region1." In other words, service cell 1 is configured to handle both types of cloud services, load balancing and secret management. The type of workflow to be handled by service cell 1 for secret man-agement service is authentication. The traffic threshold for service cell 1 is 100% of its capacity, which means that the IA request traffic for secret management service is directed to the default endpoint, service cell 0, only when a failure occurs in service cell 1.

Similar to the first and second mapping groups, the third mapping group 214 has the source of an IA request as storage cloud service. This storage cloud service is mapped to identity endpoint of service cell 2, represented by a URL, "authservices.cell2.service.ad1.region1." The type of work-flow to be handled by service cell 2 for load balancing cloud service is authorization and authentication. The traffic threshold for service cell 2 is 75% of its capacity. Endpoint service cell 0 is designated as an alternative or default identity endpoint.

The endpoint mappings (or routing information) may be updated based on feedback of quality of service (or health) in the IDDP through the discovery of traffic pattern (e.g., information in the traffic pattern/partition record), for example, which service cells are under stress or reach their capacity, or experiencing performance degradation. More service cells may be added in the mapping to handle IA request traffic from a particular cloud service. For example, a particular service cell may be under stress because the amount of IA traffic is unusually high, or has high utilization rate. A degradation may occur when the processing capacity goes down over time; for example, one or more CPUs are not functioning properly. As a result, the endpoint mappings may be updated to rebalance the load of the IDDP service cells (140-146) in the cloud IAM system.

Take an example, when a user 110 requests a load balancing cloud service from the cloud services 122 of cloud service environment 120, the cloud service environment 120 may look up both the traffic pattern/partition record and the endpoint mappings in NoSQL store 132. Based on the traffic pattern of all service cells and routing information (e.g., group 210) in the endpoint mappings, the IA request for the load balancing service may be determined to be routed to service cell 1. The routing module 124 may perform the routing accordingly. However, if the utilization rate of service cell 1 has reached 50% threshold, the extra IA request for the load balancing service may be routed to service cell 0 instead until the utilization rate of service cell 1 drops below 50%. In other words, the IA request traffic to IDDP service cells (140-146) in the cloud IAM system may be rebalanced dynamically.

Furthermore, in some embodiments, the update to the endpoint mappings can be made based on certain criteria (e.g., a configurable priority scheme) to achieve the highest availability for important services. For example, certain types/categories of services considered critical and impor-tant (e.g., load balancing, secrets management, deployment service, deployment orchestrator, etc.) may have higher priority for update than other categories, such as streaming or telemetry services. The order of update for other attributes (or fields) in the endpoint mappings may be workflow type (e.g., authentication or authorization), capacity usage/utili-zation rate threshold (e.g., shown as traffic percentage in FIG. 2), and latency characteristics (not shown in FIG. 2). In certain embodiments, latency characteristics may be processed to be reflected in (or integrated into) the utilization rate threshold. Such an integration process may reduce the amount of information to be looked up by the routing modules of a requesting client cloud service.

Once routing information (or mapping) in the endpoint mappings has been updated, the subsequent service requests of a particular type of service request can be routed to proper destination service cells based on the new routing information in the endpoint mappings. In other words, both the cloud service environment 120 and the discovery service 130 operate in parallel. The cloud service environment 120 may send IA request traffic (170a-170d) to service cells 0-N (140-146 of FIG. 1), while the discovery service 130 is sending health-check IA request traffic (180a-180d) to service cells 0-N (140-146 of FIG. 1) in the background.

For example, in FIG. 2, if the endpoint mappings have a large number of groups and cannot be updated all at once, the updates to the mapping groups with higher priority for update may be performed first. As an example, mapping group 210 for load balancing service and mapping group 212 for secret management service may be updated first because these two cloud services have higher update priority. The mapping group 214 for storage service with lower update priority may be updated after all other high-priority mapping groups have been updated. In some embodiments, high-priority groups may be updated more often than other groups.

As another example, within a high-priority mapping group, such as 210 for load balancing, the workflow information (e.g., authentication or authorization) may be updated more often than the traffic percentage attribute. For example, in mapping group 210, service cell 1 may be updated to handle both the authorization and authentication workflows for load balancing service while keeping the traffic percentage (or utilization rate threshold) at 50%.

In some embodiments, updates to endpoint mappings may also include adding or removing alternative endpoints, or even changing the initially designated endpoint. For example, for mapping group 210, the designated endpoint of service cell 1 handling load balancing service may be changed to endpoint of service cell 3 that can also handle load balancing. As another example, an additional alternative endpoint (e.g., service cell 2) may be added besides the default endpoint for service cell 0. In further embodiments, updates to endpoint mappings can be overridden by a service operator when necessary.

FIG. 3 illustrates a simplified flowchart depicting a method for dynamically routing identity and access (IA) service requests, according to certain embodiments. The processing depicted in FIG. 3 may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method presented in FIG. 3 and described below is intended to be illustrative and non-limiting. Although FIG. 3 depicts the various processing steps occurring in a particular sequence or order, this is not intended to be limiting. In certain alternative embodiments, the processing may be performed in some different order or some steps may also be performed in parallel. It should be appreciated that in alternative embodiments the processing depicted in FIG. 3 may include a greater number or a lesser number of steps than those depicted in FIG. 3.

In certain embodiments, for example, the processing depicted in FIG. 3 may be performed by CSP. Some steps may be performed by components (e.g., cloud service environment 120, discovery service 130, etc.) on the client side, and some steps may be performed by components (IDDP service cells in cloud IAM system 106. For example, step 322 may be performed by discovery service 130 to monitor the health of the cloud IAM system.

Processing commences at 310 when an identity and access (IA) service request is received for an operation to be performed by a user. For example, in FIG. 1, a user 110 of a customer of a CSP may request to use a compute service (part of cloud services 122) to launch a virtual machine (VM) (i.e., an operation to be performed). The VM, as part of the cloud service environment 120, may initiate an IA request to the cloud IAM system 106 before performing the requested operation.

At step 312, cloud service-identity endpoint mappings (i.e., endpoint mappings) between one or more cloud services and the one or more service cells in a cloud IAM system may be created. As discussed above in relation to FIGS. 1 and 2, endpoint mappings containing routing information may be created for the routing module 124 to look up and perform routing of the received IA request for a particular cloud service (e.g., compute service).

Step 320, covering 322 and 324, may perform traffic pattern discovery to update routing information in the endpoint mappings. At step 322, the health (e.g., traffic pattern) of the cloud IAM system in 312 may be monitored in the background. As discussed earlier in FIG. 1, the health of the cloud IAM system 106, including service cells (140-146) being monitored may include, but not be limited to, utilization rate, congestion conditions, and communication problems. The monitored health information may be stored in a traffic pattern/partition record for tracking the health of the cloud IAM system.

At step 324, the endpoint mappings created in 312 may be updated based on the monitored health result in 322. As discussed earlier, the updated endpoint mappings may be used to rebalance the load of the IDDP service cells in the cloud IAM system.

At step 326, subsequent IA requests for one or more cloud services are routed to the one or more service cells in the cloud IAM system based on the updated endpoint mappings. For example, in FIG. 1, an IA request for a compute service was initially sent to service cell 1 142 via route 170b. However, after the health discovery, service cell 1 was found to be overloaded (e.g., traffic volume exceeded its utilization rate threshold, such as 50%). The traffic pattern/partition record and endpoint mappings are then updated accordingly based on the discovered health result. When the user 110 requests another operation of the compute service, the routing module 124 of the requesting cloud service (e.g., compute service) of the cloud service environment 120 may look up the traffic pattern/partition record (e.g., the utilization rate information) and endpoint mappings (e.g., traffic percentage information) and determine that the new IA request for the compute service should be routed to a different service cell (e.g., service cell 0 as a fallback via route 170a or another alternative service cell 2 that can handle compute service via route 170c).

FIG. 4 illustrates a flowchart depicting a method for discovery service and updating routing information in the cloud service-identity endpoint mappings, according to certain embodiments. The processing depicted in FIG. 4 may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method presented in FIG. 4 and described below is intended to be illustrative and non-limiting. Although FIG. 4 depicts the various processing steps occurring in a particular sequence or order, this is not intended to be limiting. In certain alternative embodiments, the processing may be performed in some different order or some steps may also be performed in parallel. It should be appreciated that in alternative embodiments the processing depicted in FIG. 4 may include a greater number or a lesser number of steps than those depicted in FIG. 4.

FIG. 4 may illustrate more details of step 320 of FIG. 3. At step 410, a health-check IA request for a particular cloud service may be generated periodically. The particular cloud service may be a cloud service randomly selected from all active cloud services provided by a CSP. For example, a load balancing cloud service may be randomly selected from a set of active cloud services 122 provided by a CSP.

At step 412, a service cell capable of handling the selected cloud service for receiving the generated health-check IA request in 410 may be randomly selected. For example, the selected service cell (e.g., service cell 1 142) may be one of a few service cells that are configured to handle the selected cloud service (e.g., load balancing). At step 414, the health-check IA request for the particular cloud service is sent to the selected service cell in a cloud IAM system. For example, the health-check IA request may be sent to service cell 1 142 via route 180b by the discovery service 130. Instead of sending IA requests to all service cells handling the particular cloud service (e.g., load balancing), sending one IA request at a time can minimize the background discovery traffic.

At step 416, a response from the selected service cell may be received. For example, service cell 1 142, which receives the health-check IA request from the discovery service 130, may reply with a response back to the discovery service via the same route 180b. As discussed earlier, the response may include health information related to service cell 1, such as utilization rate, available throughput, availability, error message, etc. At step 420, the traffic pattern for each service cell in the cloud IAM system may be determined. For example, based on the response from service cell 1 about its individual health condition, the discovery service may also measure the time for receiving the response to determine the latency and other metrics related to traffic patterns. As an example, if an expected response is timeout, the discovery service may determine that the network links connected to service cell 1 may be too congested or broken.

At step 422, the endpoint mappings may be updated based on the monitored health result according to certain criteria. After the health/traffic pattern discovery, the discovery service may update a traffic pattern/partition record and the endpoint mappings accordingly for the particular cloud service and the selected service cell. As discussed earlier, the update to endpoint mappings may be based on certain criteria, such as a configurable priority of updating certain attributes (e.g., cloud service types, workflow, utilization rate, and latency). For example, after analyzing the traffic pattern/partition record containing monitored health results, the discovery service 130 may determine that the IA request traffic for secret management service may be unusually high, and service cell 1 that currently handles both load balancing service and secret management service, as shown in mapping groups 210 and 212 of FIG. 2 may be overloaded. The discovery service may reduce the traffic percentage attribute/ field in mapping group 212 from 100% to 70%, and increase the traffic percentage attribute in another mapping group (not shown) associated with an endpoint of a different service cell (e.g., service cell 3). As a result, service cell 1 and service cell 3 may receive different % of IA traffic after the update while service cell 0 remains the default (or fallback) endpoint. Since the secret management service has a higher priority for updating the endpoint mappings, the IA traffic for the secret management service can be rebalanced among service cell 0, service cell 1, and service cell 3 quickly.

Example Cloud Service Provider Infrastructure (CSPI) Architectures

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (example services include billing software, monitoring software, logging software, load balancing software, clustering software, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand)) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 5:
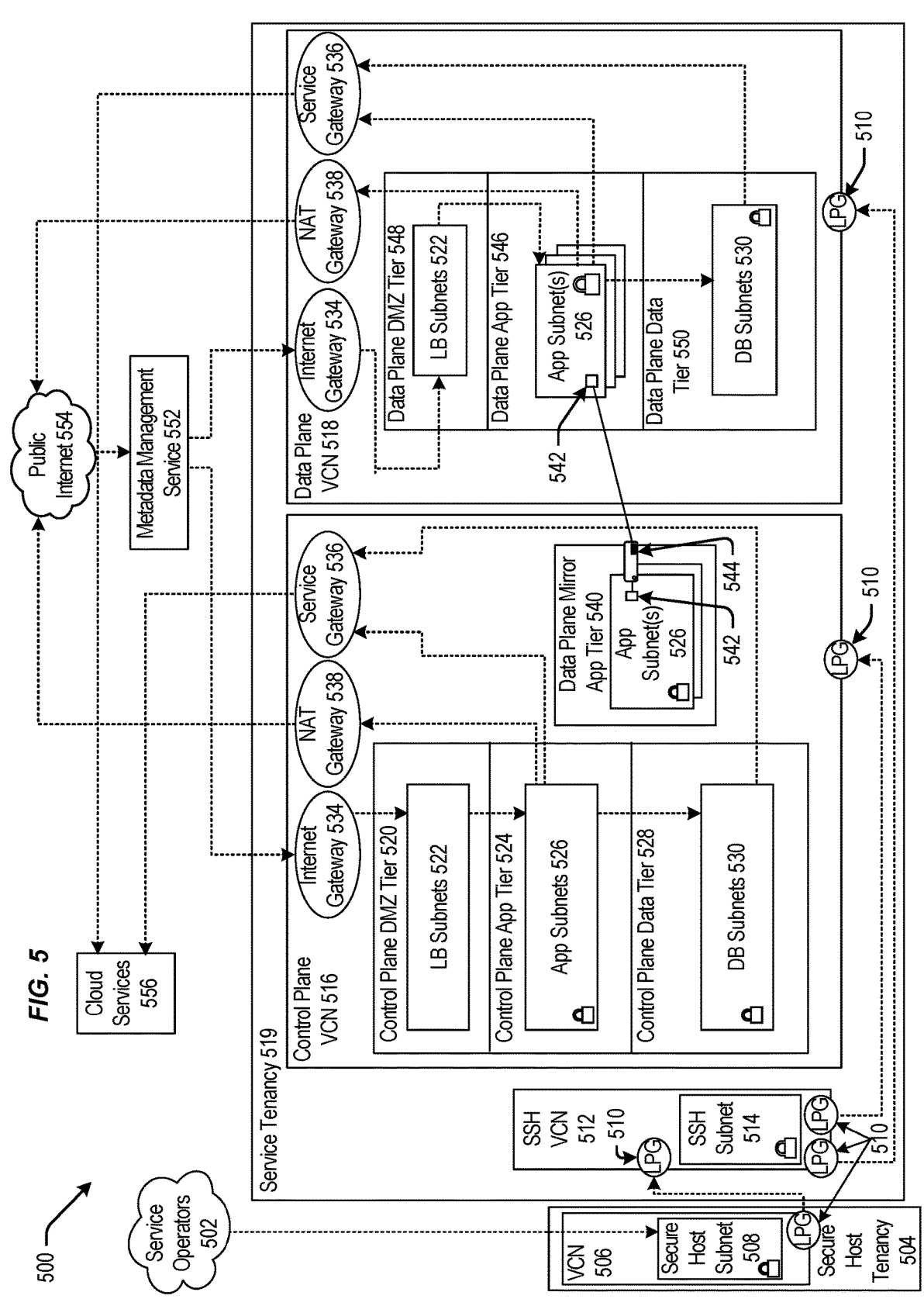
FIG. 5 is a block diagram illustrating one pattern for implementing a cloud infrastructure as a service system, according to at least one embodiment.

FIG. 5 is a block diagram 500 illustrating an example pattern of an IaaS architecture, according to at least one embodiment. Service operators 502 can be communicatively coupled to a secure host tenancy 504 that can include a virtual cloud network (VCN) 506 and a secure host subnet 508. In some examples, the service operators 502 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 506 and/or the Internet.

The VCN 506 can include a local peering gateway (LPG) 510 that can be communicatively coupled to a secure shell (SSH) VCN 512 via an LPG 510 contained in the SSH VCN 512. The SSH VCN 512 can include an SSH subnet 514, and the SSH VCN 512 can be communicatively coupled to a control plane VCN 516 via the LPG 510 contained in the control plane VCN 516. Also, the SSH VCN 512 can be communicatively coupled to a data plane VCN 518 via an LPG 510. The control plane VCN 516 and the data plane VCN 518 can be contained in a service tenancy 519 that can be owned and/or operated by the IaaS provider.

The control plane VCN 516 can include a control plane demilitarized zone (DMZ) tier 520 that acts as a perimeter network (e.g., portions of a corporate network between the corporate intranet and external networks). The DMZ-based servers may have restricted responsibilities and help keep breaches contained. Additionally, the DMZ tier 520 can include one or more load balancer (LB) subnet(s) 522, a control plane app tier 524 that can include app subnet(s) 526, a control plane data tier 528 that can include database (DB) subnet(s) 530 (e.g., frontend DB subnet(s) and/or backend DB subnet(s)). The LB subnet(s) 522 contained in the control plane DMZ tier 520 can be communicatively coupled to the app subnet(s) 526 contained in the control plane app tier 524 and an Internet gateway 534 that can be contained in the control plane VCN 516, and the app subnet(s) 526 can be communicatively coupled to the DB subnet(s) 530 contained in the control plane data tier 528 and a service gateway 536 and a network address translation (NAT) gateway 538. The control plane VCN 516 can include the service gateway 536 and the NAT gateway 538.

The control plane VCN 516 can include a data plane mirror app tier 540 that can include app subnet(s) 526. The app subnet(s) 526 contained in the data plane mirror app tier 540 can include a virtual network interface controller (VNIC) 542 that can execute a compute instance 544. The compute instance 544 can communicatively couple the app subnet(s) 526 of the data plane mirror app tier 540 to app subnet(s) 526 that can be contained in a data plane app tier 546.

The data plane VCN 518 can include the data plane app tier 546, a data plane DMZ tier 548, and a data plane data tier 550. The data plane DMZ tier 548 can include LB subnet(s) 522 that can be communicatively coupled to the app subnet(s) 526 of the data plane app tier 546 and the Internet gateway 534 of the data plane VCN 518. The app subnet(s) 526 can be communicatively coupled to the service gateway 536 of the data plane VCN 518 and the NAT gateway 538 of the data plane VCN 518. The data plane data tier 550 can also include the DB subnet(s) 530 that can be communicatively coupled to the app subnet(s) 526 of the data plane app tier 546.

The Internet gateway 534 of the control plane VCN 516 and of the data plane VCN 518 can be communicatively coupled to a metadata management service 552 that can be communicatively coupled to public Internet 554. Public Internet 554 can be communicatively coupled to the NAT gateway 538 of the control plane VCN 516 and of the data plane VCN 518. The service gateway 536 of the control plane VCN 516 and of the data plane VCN 518 can be communicatively coupled to cloud services 556.

In some examples, the service gateway 536 of the control plane VCN 516 or of the data plane VCN 518 can make application programming interface (API) calls to cloud services 556 without going through public Internet 554. The API calls to cloud services 556 from the service gateway 536 can be one-way: the service gateway 536 can make API calls to cloud services 556, and cloud services 556 can send requested data to the service gateway 536. But, cloud services 556 may not initiate API calls to the service gateway 536.

In some examples, the secure host tenancy 504 can be directly connected to the service tenancy 519, which may be otherwise isolated. The secure host subnet 508 can communicate with the SSH subnet 514 through an LPG 510 that may enable two-way communication over an otherwise isolated system. Connecting the secure host subnet 508 to the SSH subnet 514 may give the secure host subnet 508 access to other entities within the service tenancy 519.

The control plane VCN 516 may allow users of the service tenancy 519 to set up or otherwise provision desired resources. Desired resources provisioned in the control plane VCN 516 may be deployed or otherwise used in the data plane VCN 518. In some examples, the control plane VCN 516 can be isolated from the data plane VCN 518, and the data plane mirror app tier 540 of the control plane VCN 516 can communicate with the data plane app tier 546 of the data plane VCN 518 via VNICs 542 that can be contained in the data plane mirror app tier 540 and the data plane app tier 546.

In some examples, users of the system, or customers, can make requests, for example create, read, update, or delete (CRUD) operations, through public Internet 554 that can communicate the requests to the metadata management service 552. The metadata management service 552 can communicate the request to the control plane VCN 516 through the Internet gateway 534. The request can be received by the LB subnet(s) 522 contained in the control plane DMZ tier 520. The LB subnet(s) 522 may determine that the request is valid, and in response to this determination, the LB subnet(s) 522 can transmit the request to app subnet(s) 526 contained in the control plane app tier 524. If the request is validated and requires a call to public Internet 554, the call to public Internet 554 may be transmitted to the NAT gateway 538 that can make the call to public Internet 554. Metadata that may be desired to be stored by the request can be stored in the DB subnet(s) 530.

In some examples, the data plane mirror app tier 540 can facilitate direct communication between the control plane VCN 516 and the data plane VCN 518. For example, changes, updates, or other suitable modifications to configuration may be desired to be applied to the resources contained in the data plane VCN 518. Via a VNIC 542, the control plane VCN 516 can directly communicate with, and can thereby execute the changes, updates, or other suitable modifications to configuration to, resources contained in the data plane VCN 518.

In some embodiments, the control plane VCN 516 and the data plane VCN 518 can be contained in the service tenancy 519. In this case, the user, or the customer, of the system may not own or operate either the control plane VCN 516 or the data plane VCN 518. Instead, the IaaS provider may own or operate the control plane VCN 516 and the data plane VCN 518, both of which may be contained in the service tenancy 519. This embodiment can enable isolation of networks that may prevent users or customers from interacting with other users', or other customers', resources. Also, this embodiment may allow users or customers of the system to store databases privately without needing to rely on public Internet 554, which may not have a desired level of threat prevention, for storage.

In other embodiments, the LB subnet(s) 522 contained in the control plane VCN 516 can be configured to receive a signal from the service gateway 536. In this embodiment, the control plane VCN 516 and the data plane VCN 518 may be configured to be called by a customer of the IaaS provider without calling public Internet 554. Customers of the IaaS provider may desire this embodiment since database(s) that the customers use may be controlled by the IaaS provider and may be stored on the service tenancy 519, which may be isolated from public Internet 554.

Figure 6:
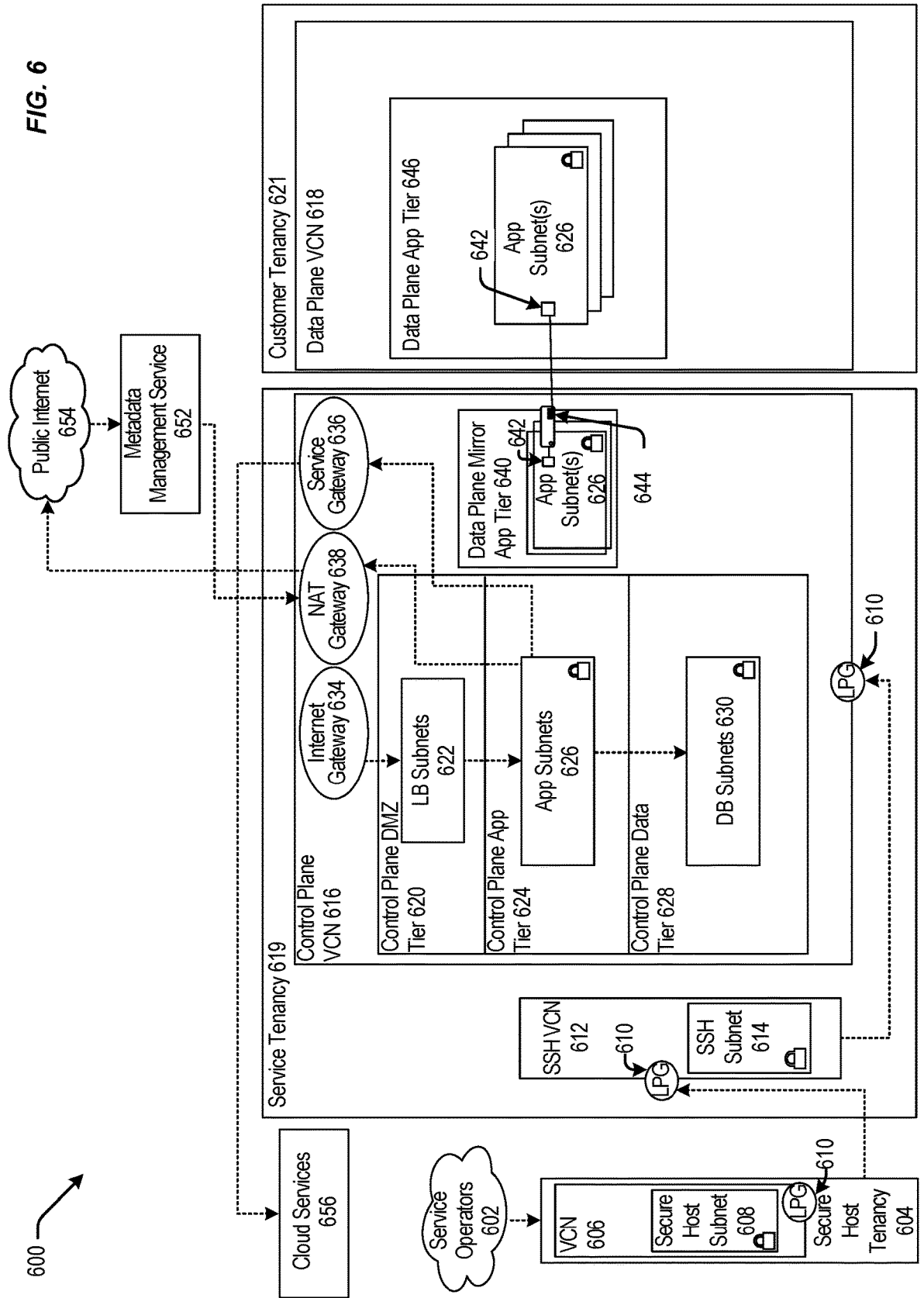
FIG. 6 is a block diagram illustrating another pattern for implementing a cloud infrastructure as a service system, according to at least one embodiment.

FIG. 6 is a block diagram 600 illustrating another example pattern of an IaaS architecture, according to at least one embodiment. Service operators 602 (e.g., service operators 502 of FIG. 5) can be communicatively coupled to a secure host tenancy 604 (e.g., the secure host tenancy 504 of FIG. 5) that can include a virtual cloud network (VCN) 606 (e.g., the VCN 506 of FIG. 5) and a secure host subnet 608 (e.g., the secure host subnet 508 of FIG. 5). The VCN 606 can include a local peering gateway (LPG) 610 (e.g., the LPG 510 of FIG. 5) that can be communicatively coupled to a secure shell (SSH) VCN 612 (e.g., the SSH VCN 512 of FIG. 5) via an LPG 510 contained in the SSH VCN 612. The SSH VCN 612 can include an SSH subnet 614 (e.g., the SSH subnet 514 of FIG. 5), and the SSH VCN 612 can be communicatively coupled to a control plane VCN 616 (e.g., the control plane VCN 516 of FIG. 5) via an LPG 610 contained in the control plane VCN 616. The control plane VCN 616 can be contained in a service tenancy 619 (e.g., the service tenancy 519 of FIG. 5), and the data plane VCN 618 (e.g., the data plane VCN 518 of FIG. 5) can be contained in a customer tenancy 621 that may be owned or operated by users, or customers, of the system.

The control plane VCN 616 can include a control plane DMZ tier 620 (e.g., the control plane DMZ tier 520 of FIG. 5) that can include LB subnet(s) 622 (e.g., LB subnet(s) 522 of FIG. 5), a control plane app tier 624 (e.g., the control plane app tier 524 of FIG. 5) that can include app subnet(s) 626 (e.g., app subnet(s) 526 of FIG. 5), a control plane data tier 628 (e.g., the control plane data tier 528 of FIG. 5) that can include database (DB) subnet(s) 630 (e.g., similar to DB subnet(s) 530 of FIG. 5). The LB subnet(s) 622 contained in the control plane DMZ tier 620 can be communicatively coupled to the app subnet(s) 626 contained in the control plane app tier 624 and an Internet gateway 634 (e.g., the Internet gateway 534 of FIG. 5) that can be contained in the control plane VCN 616, and the app subnet(s) 626 can be communicatively coupled to the DB subnet(s) 630 contained in the control plane data tier 628 and a service gateway 636 (e.g., the service gateway 536 of FIG. 5) and a network address translation (NAT) gateway 638 (e.g., the NAT gateway 538 of FIG. 5). The control plane VCN 616 can include the service gateway 636 and the NAT gateway 638.

The control plane VCN 616 can include a data plane mirror app tier 640 (e.g., the data plane mirror app tier 540 of FIG. 5) that can include app subnet(s) 626. The app subnet(s) 626 contained in the data plane mirror app tier 640 can include a virtual network interface controller (VNIC) 642 (e.g., the VNIC of 542) that can execute a compute instance 644 (e.g., similar to the compute instance 544 of FIG. 5). The compute instance 644 can facilitate communication between the app subnet(s) 626 of the data plane mirror app tier 640 and the app subnet(s) 626 that can be contained in a data plane app tier 646 (e.g., the data plane app tier 546 of FIG. 5) via the VNIC 642 contained in the data plane mirror app tier 640 and the VNIC 642 contained in the data plane app tier 646.

The Internet gateway 634 contained in the control plane VCN 616 can be communicatively coupled to a metadata management service 652 (e.g., the metadata management service 552 of FIG. 5) that can be communicatively coupled to public Internet 654 (e.g., public Internet 554 of FIG. 5). Public Internet 654 can be communicatively coupled to the NAT gateway 638 contained in the control plane VCN 616. The service gateway 636 contained in the control plane VCN 616 can be communicatively coupled to cloud services 656 (e.g., cloud services 556 of FIG. 5).

In some examples, the data plane VCN 618 can be contained in the customer tenancy 621. In this case, the IaaS provider may provide the control plane VCN 616 for each customer, and the IaaS provider may, for each customer, set up a unique compute instance 644 that is contained in the service tenancy 619. Each compute instance 644 may allow communication between the control plane VCN 616, contained in the service tenancy 619, and the data plane VCN 618 that is contained in the customer tenancy 621. The compute instance 644 may allow resources, that are provisioned in the control plane VCN 616 that is contained in the service tenancy 619, to be deployed or otherwise used in the data plane VCN 618 that is contained in the customer tenancy 621.

In other examples, the customer of the IaaS provider may have databases that live in the customer tenancy 621. In this example, the control plane VCN 616 can include the data plane mirror app tier 640 that can include app subnet(s) 626. The data plane mirror app tier 640 can reside in the data plane VCN 618, but the data plane mirror app tier 640 may not live in the data plane VCN 618. That is, the data plane mirror app tier 640 may have access to the customer tenancy 621, but the data plane mirror app tier 640 may not exist in the data plane VCN 618 or be owned or operated by the customer of the IaaS provider. The data plane mirror app tier 640 may be configured to make calls to the data plane VCN 618 but may not be configured to make calls to any entity contained in the control plane VCN 616. The customer may desire to deploy or otherwise use resources in the data plane VCN 618 that are provisioned in the control plane VCN 616, and the data plane mirror app tier 640 can facilitate the desired deployment, or other usage of resources, of the customer.

In some embodiments, the customer of the IaaS provider can apply filters to the data plane VCN 618. In this embodiment, the customer can determine what the data plane VCN 618 can access, and the customer may restrict access to public Internet 654 from the data plane VCN 618. The IaaS provider may not be able to apply filters or otherwise control access of the data plane VCN 618 to any outside networks or databases. Applying filters and controls by the customer onto the data plane VCN 618, contained in the customer tenancy 621, can help isolate the data plane VCN 618 from other customers and from public Internet 654.

In some embodiments, cloud services 656 can be called by the service gateway 636 to access services that may not exist on public Internet 654, on the control plane VCN 616, or on the data plane VCN 618. The connection between cloud services 656 and the control plane VCN 616 or the data plane VCN 618 may not be live or continuous. Cloud services 656 may exist on a different network owned or operated by the IaaS provider. Cloud services 656 may be configured to receive calls from the service gateway 636 and may be configured to not receive calls from public Internet 654. Some cloud services 656 may be isolated from other cloud services 656, and the control plane VCN 616 may be isolated from cloud services 656 that may not be in the same region as the control plane VCN 616. For example, the control plane VCN 616 may be located in "Region 1," and cloud service "Deployment 5," may be located in Region 1 and in "Region 2." If a call to Deployment 5 is made by the service gateway 636 contained in the control plane VCN 616 located in Region 1, the call may be transmitted to Deployment 5 in Region 1. In this example, the control plane VCN 616, or Deployment 5 in Region 1, may not be communicatively coupled to, or otherwise in communication with, Deployment 5 in Region 2.

Figure 7:
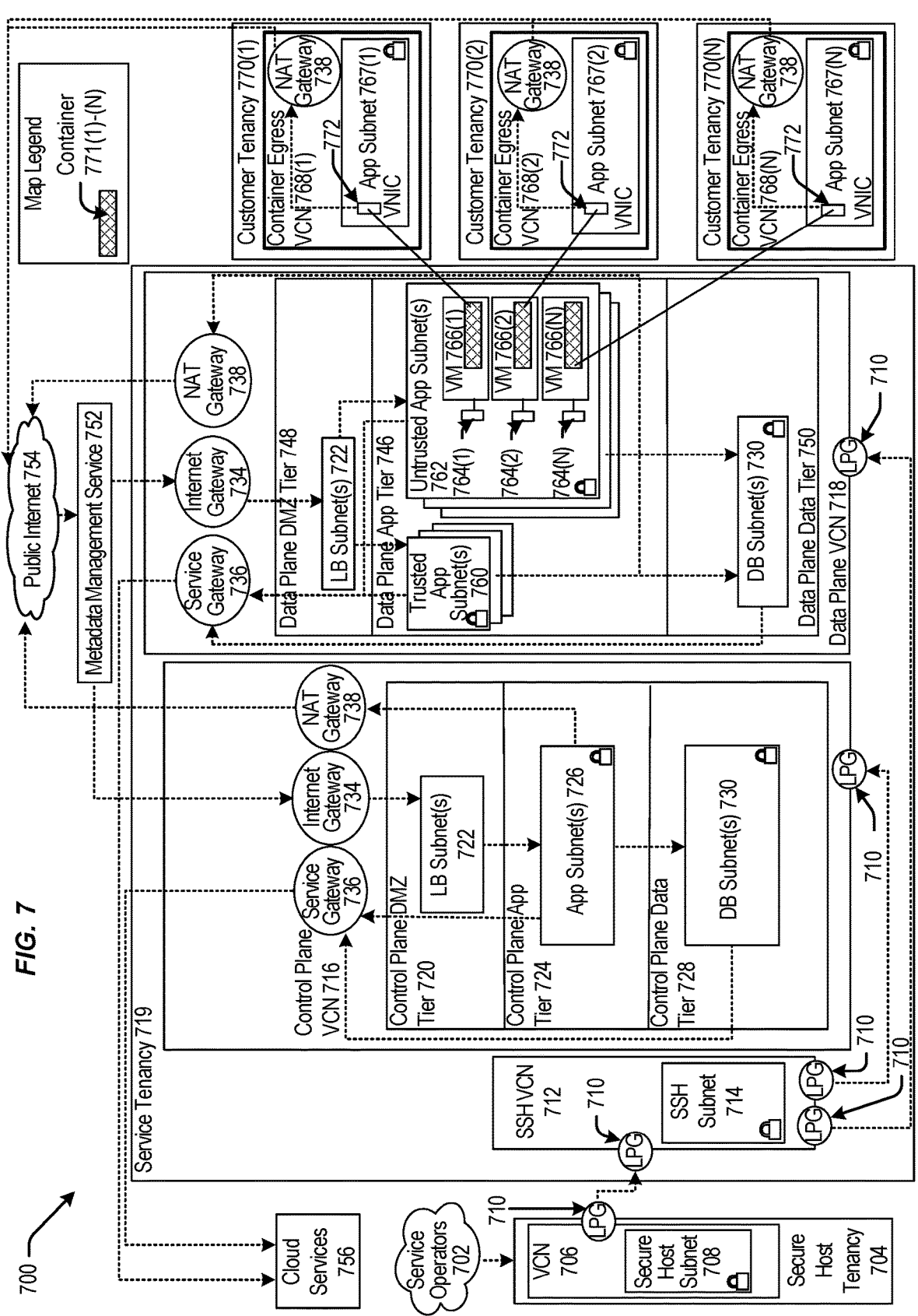
FIG. 7 is a block diagram illustrating another pattern for implementing a cloud infrastructure as a service system, according to at least one embodiment.

FIG. 7 is a block diagram 700 illustrating another example pattern of an IaaS architecture, according to at least one embodiment. Service operators 702 (e.g., service operators 502 of FIG. 5) can be communicatively coupled to a secure host tenancy 704 (e.g., the secure host tenancy 504 of FIG. 5) that can include a virtual cloud network (VCN) 706 (e.g., the VCN 506 of FIG. 5) and a secure host subnet 708 (e.g., the secure host subnet 508 of FIG. 5). The VCN 706 can include an LPG 710 (e.g., the LPG 510 of FIG. 5) that can be communicatively coupled to an SSH VCN 712 (e.g., the SSH VCN 512 of FIG. 5) via an LPG 710 contained in the SSH VCN 712. The SSH VCN 712 can include an SSH subnet 714 (e.g., the SSH subnet 514 of FIG. 5), and the SSH VCN 712 can be communicatively coupled to a control plane VCN 716 (e.g., the control plane VCN 516 of FIG. 5) via an LPG 710 contained in the control plane VCN 716 and to a data plane VCN 718 (e.g., the data plane 518 of FIG. 5) via an LPG 710 contained in the data plane VCN 718. The control plane VCN 716 and the data plane VCN 718 can be contained in a service tenancy 719 (e.g., the service tenancy 519 of FIG. 5).

The control plane VCN 716 can include a control plane DMZ tier 720 (e.g., the control plane DMZ tier 520 of FIG. 5) that can include load balancer (LB) subnet(s) 722 (e.g., LB subnet(s) 522 of FIG. 5), a control plane app tier 724 (e.g., the control plane app tier 524 of FIG. 5) that can include app subnet(s) 726 (e.g., similar to app subnet(s) 526 of FIG. 5), a control plane data tier 728 (e.g., the control plane data tier 528 of FIG. 5) that can include DB subnet(s) 730. The LB subnet(s) 722 contained in the control plane DMZ tier 720 can be communicatively coupled to the app subnet(s) 726 contained in the control plane app tier 724 and to an Internet gateway 734 (e.g., the Internet gateway 534 of FIG. 5) that can be contained in the control plane VCN 716, and the app subnet(s) 726 can be communicatively coupled to the DB subnet(s) 730 contained in the control plane data tier 728 and to a service gateway 736 (e.g., the service gateway of FIG. 5) and a network address translation (NAT) gateway 738 (e.g., the NAT gateway 538 of FIG. 5). The control plane VCN 716 can include the service gateway 736 and the NAT gateway 738.

The data plane VCN 718 can include a data plane app tier 746 (e.g., the data plane app tier 546 of FIG. 5), a data plane DMZ tier 748 (e.g., the data plane DMZ tier 548 of FIG. 5), and a data plane data tier 750 (e.g., the data plane data tier 550 of FIG. 5). The data plane DMZ tier 748 can include LB subnet(s) 722 that can be communicatively coupled to trusted app subnet(s) 760 and untrusted app subnet(s) 762 of the data plane app tier 746 and the Internet gateway 734 contained in the data plane VCN 718. The trusted app subnet(s) 760 can be communicatively coupled to the service gateway 736 contained in the data plane VCN 718, the NAT gateway 738 contained in the data plane VCN 718, and DB subnet(s) 730 contained in the data plane data tier 750. The untrusted app subnet(s) 762 can be communicatively coupled to the service gateway 736 contained in the data plane VCN 718 and DB subnet(s) 730 contained in the data plane data tier 750. The data plane data tier 750 can include DB subnet(s) 730 that can be communicatively coupled to the service gateway 736 contained in the data plane VCN 718.

The untrusted app subnet(s) 762 can include one or more primary VNICs 764(1)-(N) that can be communicatively coupled to tenant virtual machines (VMs) 766(1)-(N). Each tenant VM 766(1)-(N) can be communicatively coupled to a respective app subnet 767(1)-(N) that can be contained in respective container egress VCNs 768(1)-(N) that can be contained in respective customer tenancies 770(1)-(N). Respective secondary VNICs 772(1)-(N) can facilitate communication between the untrusted app subnet(s) 762 contained in the data plane VCN 718 and the app subnet contained in the container egress VCNs 768(1)-(N). Each container egress VCNs 768(1)-(N) can include a NAT gateway 738 that can be communicatively coupled to public Internet 754 (e.g., public Internet 554 of FIG. 5).

The Internet gateway 734 contained in the control plane VCN 716 and contained in the data plane VCN 718 can be communicatively coupled to a metadata management service 752 (e.g., the metadata management system 552 of FIG. 5) that can be communicatively coupled to public Internet 754. Public Internet 754 can be communicatively coupled to the NAT gateway 738 contained in the control plane VCN 716 and contained in the data plane VCN 718. The service gateway 736 contained in the control plane VCN 716 and contained in the data plane VCN 718 can be communicatively coupled to cloud services 756.

In some embodiments, the data plane VCN 718 can be integrated with customer tenancies 770. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 746. Code to run the function may be executed in the VMs 766(1)-(N), and the code may not be configured to run anywhere else on the data plane VCN 718. Each VM 766(1)-(N) may be connected to one customer tenancy 770. Respective containers 771(1)-(N) contained in the VMs 766(1)-(N) may be configured to run the code. In this case, there can be a dual isolation (e.g., the containers 771(1)-(N) running code, where the containers 771(1)-(N) may be contained in at least the VM 766(1)-(N) that are contained in the untrusted app subnet(s) 762), which may help prevent incorrect or otherwise undesirable code from damaging the network of the IaaS provider or from damaging a network of a different customer. The containers 771(1)-(N) may be communicatively coupled to the customer tenancy 770 and may be configured to transmit or receive data from the customer tenancy 770. The containers 771(1)-(N) may not be configured to transmit or receive data from any other entity in the data plane VCN 718. Upon completion of running the code, the IaaS provider may kill or otherwise dispose of the containers 771(1)-(N).

In some embodiments, the trusted app subnet(s) 760 may run code that may be owned or operated by the IaaS provider. In this embodiment, the trusted app subnet(s) 760 may be communicatively coupled to the DB subnet(s) 730 and be configured to execute CRUD operations in the DB subnet(s) 730. The untrusted app subnet(s) 762 may be communicatively coupled to the DB subnet(s) 730, but in this embodiment, the untrusted app subnet(s) may be configured to execute read operations in the DB subnet(s) 730. The containers 771(1)-(N) that can be contained in the VM 766(1)-(N) of each customer and that may run code from the customer may not be communicatively coupled with the DB subnet(s) 730.

In other embodiments, the control plane VCN 716 and the data plane VCN 718 may not be directly communicatively coupled. In this embodiment, there may be no direct communication between the control plane VCN 716 and the data plane VCN 718. However, communication can occur indirectly through at least one method. An LPG 710 may be established by the IaaS provider that can facilitate communication between the control plane VCN 716 and the data plane VCN 718. In another example, the control plane VCN 716 or the data plane VCN 718 can make a call to cloud services 756 via the service gateway 736. For example, a call to cloud services 756 from the control plane VCN 716 can include a request for a service that can communicate with the data plane VCN 718.

Figure 8:
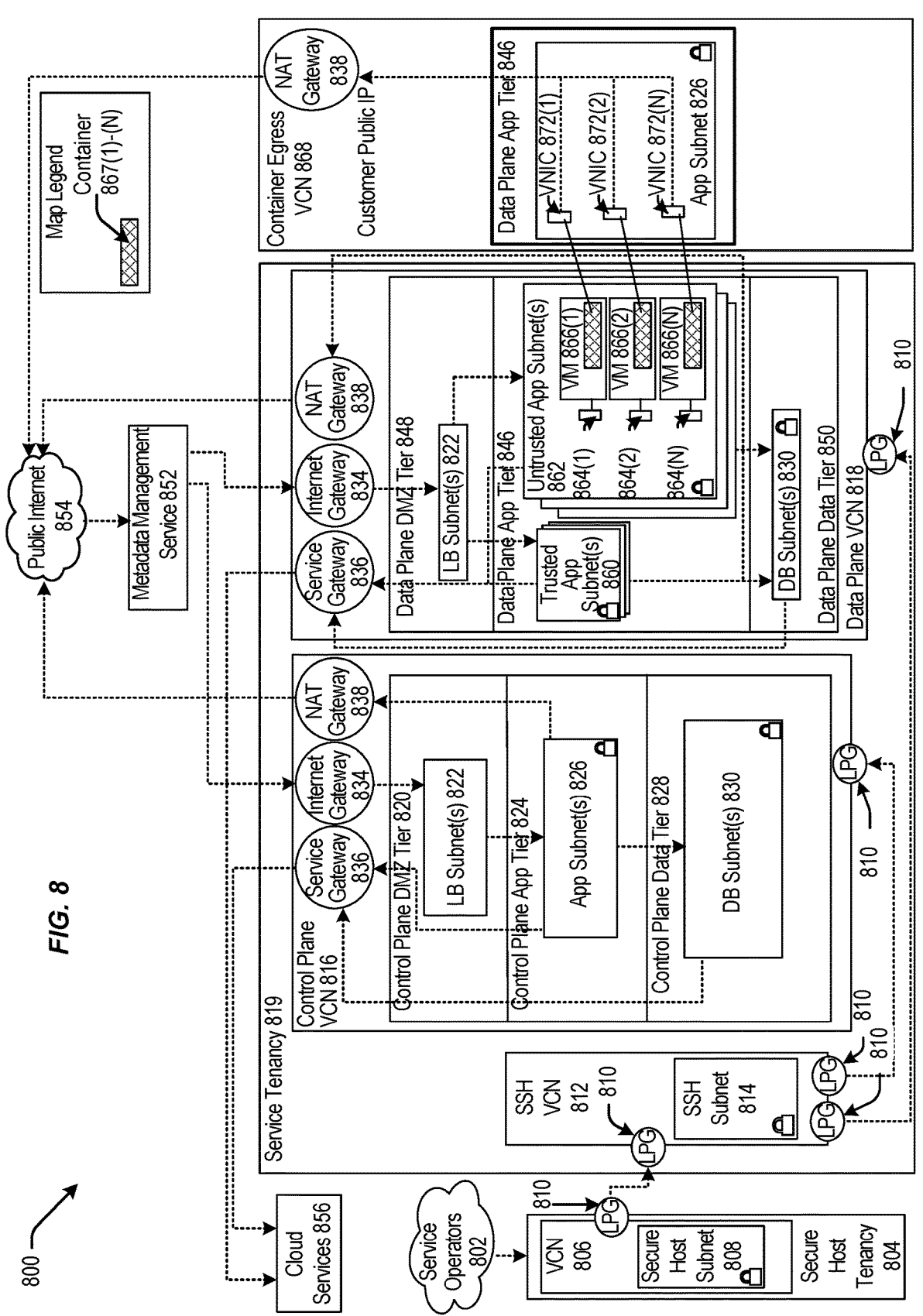
FIG. 8 is a block diagram illustrating another pattern for implementing a cloud infrastructure as a service system, according to at least one embodiment.

FIG. 8 is a block diagram 800 illustrating another example pattern of an IaaS architecture, according to at least one embodiment. Service operators 802 (e.g., service operators 502 of FIG. 5) can be communicatively coupled to a secure host tenancy 804 (e.g., the secure host tenancy 504 of FIG. 5) that can include a virtual cloud network (VCN) 806 (e.g., the VCN 506 of FIG. 5) and a secure host subnet 808 (e.g., the secure host subnet 508 of FIG. 5). The VCN 806 can include an LPG 810 (e.g., the LPG 510 of FIG. 5) that can be communicatively coupled to an SSH VCN 812 (e.g., the SSH VCN 512 of FIG. 5) via an LPG 810 contained in the SSH VCN 812. The SSH VCN 812 can include an SSH subnet 814 (e.g., the SSH subnet 514 of FIG. 5), and the SSH VCN 812 can be communicatively coupled to a control plane VCN 816 (e.g., the control plane VCN 516 of FIG. 5) via an LPG 810 contained in the control plane VCN 816 and to a data plane VCN 818 (e.g., the data plane 518 of FIG. 5) via an LPG 810 contained in the data plane VCN 818. The control plane VCN 816 and the data plane VCN 818 can be contained in a service tenancy 819 (e.g., the service tenancy 519 of FIG. 5).

The control plane VCN 816 can include a control plane DMZ tier 820 (e.g., the control plane DMZ tier 520 of FIG. 5) that can include LB subnet(s) 822 (e.g., LB subnet(s) 522 of FIG. 5), a control plane app tier 824 (e.g., the control plane app tier 524 of FIG. 5) that can include app subnet(s) 826 (e.g., app subnet(s) 526 of FIG. 5), a control plane data tier 828 (e.g., the control plane data tier 528 of FIG. 5) that can include DB subnet(s) 830 (e.g., DB subnet(s) 730 of FIG. 7). The LB subnet(s) 822 contained in the control plane DMZ tier 820 can be communicatively coupled to the app subnet(s) 826 contained in the control plane app tier 824 and to an Internet gateway 834 (e.g., the Internet gateway 534 of FIG. 5) that can be contained in the control plane VCN 816, and the app subnet(s) 826 can be communicatively coupled to the DB subnet(s) 830 contained in the control plane data tier 828 and to a service gateway 836 (e.g., the service gateway of FIG. 5) and a network address translation (NAT) gateway 838 (e.g., the NAT gateway 538 of FIG. 5). The control plane VCN 816 can include the service gateway 836 and the NAT gateway 838.

The data plane VCN 818 can include a data plane app tier 846 (e.g., the data plane app tier 546 of FIG. 5), a data plane DMZ tier 848 (e.g., the data plane DMZ tier 548 of FIG. 5), and a data plane data tier 850 (e.g., the data plane data tier 550 of FIG. 5). The data plane DMZ tier 848 can include LB subnet(s) 822 that can be communicatively coupled to trusted app subnet(s) 860 (e.g., trusted app subnet(s) 760 of FIG. 7) and untrusted app subnet(s) 862 (e.g., untrusted app subnet(s) 762 of FIG. 7) of the data plane app tier 846 and the Internet gateway 834 contained in the data plane VCN 818. The trusted app subnet(s) 860 can be communicatively coupled to the service gateway 836 contained in the data plane VCN 818, the NAT gateway 838 contained in the data plane VCN 818, and DB subnet(s) 830 contained in the data plane data tier 850. The untrusted app subnet(s) 862 can be communicatively coupled to the service gateway 836 contained in the data plane VCN 818 and DB subnet(s) 830 contained in the data plane data tier 850. The data plane data tier 850 can include DB subnet(s) 830 that can be communicatively coupled to the service gateway 836 contained in the data plane VCN 818.

The untrusted app subnet(s) 862 can include primary VNICs 864(1)-(N) that can be communicatively coupled to tenant virtual machines (VMs) 866(1)-(N) residing within the untrusted app subnet(s) 862. Each tenant VM 866(1)-(N) can run code in a respective container 867(1)-(N), and be communicatively coupled to an app subnet 826 that can be contained in a data plane app tier 846 that can be contained in a container egress VCN 868. Respective secondary VNICs 872(1)-(N) can facilitate communication between the untrusted app subnet(s) 862 contained in the data plane VCN 818 and the app subnet contained in the container egress VCN 868. The container egress VCN can include a NAT gateway 838 that can be communicatively coupled to public Internet 854 (e.g., public Internet 554 of FIG. 5).

The Internet gateway 834 contained in the control plane VCN 816 and contained in the data plane VCN 818 can be communicatively coupled to a metadata management service 852 (e.g., the metadata management system 552 of FIG. 5) that can be communicatively coupled to public Internet 854. Public Internet 854 can be communicatively coupled to the NAT gateway 838 contained in the control plane VCN 816 and contained in the data plane VCN 818. The service gateway 836 contained in the control plane VCN 816 and contained in the data plane VCN 818 can be communicatively coupled to cloud services 856.

In some examples, the pattern illustrated by the architecture of block diagram 800 of FIG. 8 may be considered an exception to the pattern illustrated by the architecture of block diagram 700 of FIG. 7 and may be desirable for a customer of the IaaS provider if the IaaS provider cannot directly communicate with the customer (e.g., a disconnected region). The respective containers 867(1)-(N) that are contained in the VMs 866(1)-(N) for each customer can be accessed in real-time by the customer. The containers 867(1)-(N) may be configured to make calls to respective secondary VNICs 872(1)-(N) contained in app subnet(s) 826 of the data plane app tier 846 that can be contained in the container egress VCN 868. The secondary VNICS 872(1)-(N) can transmit the calls to the NAT gateway 838 that may transmit the calls to public Internet 854. In this example, the containers 867(1)-(N) that can be accessed in real-time by the customer can be isolated from the control plane VCN 816 and can be isolated from other entities contained in the data plane VCN 818. The containers 867(1)-(N) may also be isolated from resources from other customers.

In other examples, the customer can use the containers 867(1)-(N) to call cloud services 856. In this example, the customer may run code in the containers 867(1)-(N) that requests a service from cloud services 856. The containers

867(1)-(N) can transmit this request to the secondary VNICs 872(1)-(N) that can transmit the request to the NAT gateway that can transmit the request to public Internet 854. Public Internet 854 can transmit the request to LB subnet(s) 822 contained in the control plane VCN 816 via the Internet gateway 834. In response to determining the request is valid, the LB subnet(s) can transmit the request to app subnet(s) 826 that can transmit the request to cloud services 856 via the service gateway 836.

It should be appreciated that IaaS architectures 500, 600, 700, 800 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 9:
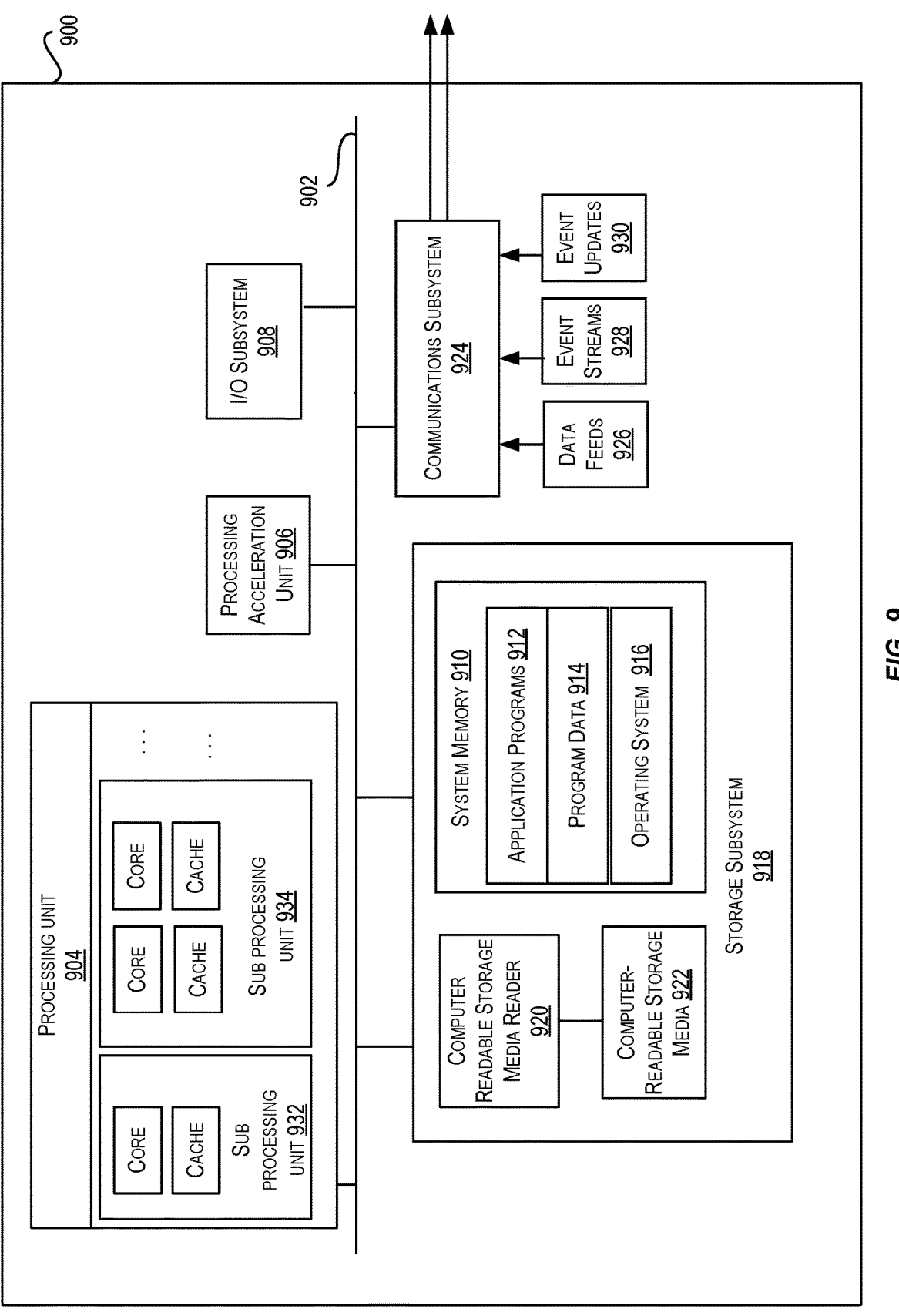
FIG. 9 is a block diagram illustrating an example computer system, according to at least one embodiment.

FIG. 9 illustrates an example computer system 900, in which various embodiments may be implemented. The system 900 may be used to implement any of the computer systems described above. As shown in the figure, computer system 900 includes a processing unit 904 that communicates with a number of peripheral subsystems via a bus subsystem 902. These peripheral subsystems may include a processing acceleration unit 906, an I/O subsystem 908, a storage subsystem 918 and a communications subsystem 924. Storage subsystem 918 includes tangible computer-readable storage media 922 and a system memory 910.

Bus subsystem 902 provides a mechanism for letting the various components and subsystems of computer system 900 communicate with each other as intended. Although bus subsystem 902 is shown schematically as a single bus, alternative embodiments of the bus subsystem may utilize multiple buses. Bus subsystem 902 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 904, which can be implemented as one or more integrated circuits (e.g., a conventional microprocessor or microcontroller), controls the operation of computer system 900. One or more processors may be included in processing unit 904. These processors may include single core or multicore processors. In certain embodiments, processing unit 904 may be implemented as one or more independent processing units 932 and/or 934 with single or multicore processors included in each processing unit. In other embodiments, processing unit 904 may also be implemented as a quad-core processing unit formed by integrating two dual-core processors into a single chip.

In various embodiments, processing unit 904 can execute a variety of programs in response to program code and can maintain multiple concurrently executing programs or processes. At any given time, some or all of the program code to be executed can be resident in processor(s) 904 and/or in storage subsystem 918. Through suitable programming, processor(s) 904 can provide various functionalities described above. Computer system 900 may additionally include a processing acceleration unit 906, which can include a digital signal processor (DSP), a special-purpose processor, and/or the like.

I/O subsystem 908 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments, and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 900 to a user or other computer. For example, user interface output devices may include, without limitation, a variety of display devices that visually convey text, graphics, and audio/video information such as monitors, printers, speakers, headphones, automotive navigation systems, plotters, voice output devices, and modems.

Computer system 900 may comprise a storage subsystem 918 that provides a tangible non-transitory computer-readable storage medium for storing software and data constructs that provide the functionality of the embodiments described in this disclosure. The software can include programs, code modules, instructions, scripts, etc., that when executed by one or more cores or processors of processing unit 904 provide the functionality described above. Storage subsystem 918 may also provide a repository for storing data used in accordance with the present disclosure.

As depicted in the example in FIG. 9, storage subsystem 918 can include various components including a system memory 910, computer-readable storage media 922, and a computer readable storage media reader 920. System memory 910 may store program instructions that are loadable and executable by processing unit 904. System memory 910 may also store data that is used during the execution of the instructions and/or data that is generated during the execution of the program instructions. Various different kinds of programs may be loaded into system memory 910 including but not limited to client applications, Web browsers, mid-tier applications, relational database management systems (RDBMS), virtual machines, containers, etc.

System memory 910 may also store an operating system 916. Examples of operating system 916 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems. In certain implementations where computer system 900 executes one or more virtual machines, the virtual machines along with their guest operating systems (GOSs) may be loaded into system memory 910 and executed by one or more processors or cores of processing unit 904.

System memory 910 can come in different configurations depending upon the type of computer system 900. For example, system memory 910 may be volatile memory (such as random access memory (RAM)) and/or non-volatile memory (such as read-only memory (ROM), flash memory, etc.) Different types of RAM configurations may be provided including a static random access memory (SRAM), a dynamic random access memory (DRAM), and others. In some implementations, system memory 910 may include a basic input/output system (BIOS) containing basic routines that help to transfer information between elements within computer system 900, such as during start-up.

Computer-readable storage media 922 may represent remote, local, fixed, and/or removable storage devices plus storage media for temporarily and/or more permanently containing, storing, computer-readable information for use by computer system 900 including instructions executable by processing unit 904 of computer system 900.

Computer-readable storage media 922 can include any appropriate media known or used in the art, including storage media and communication media, such as but not limited to, volatile and non-volatile, removable, and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

By way of example, computer-readable storage media 922 may include a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM, DVD, and Blu-Ray® disk, or other optical media. Computer-readable storage media 922 may include, but is not limited to, Zip® drives, flash memory cards, universal serial bus (USB) flash drives, secure digital (SD) cards, DVD disks, digital video tape, and the like. Computer-readable storage media 922 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 900.

Machine-readable instructions executable by one or more processors or cores of processing unit 904 may be stored on a non-transitory computer-readable storage medium. A non-transitory computer-readable storage medium can include physically tangible memory or storage devices that include volatile memory storage devices and/or non-volatile storage devices. Examples of non-transitory computer-readable storage medium include magnetic storage media (e.g., disk or tapes), optical storage media (e.g., DVDs, CDs), various types of RAM, ROM, or flash memory, hard drives, floppy drives, detachable memory drives (e.g., USB drives), or other type of storage device.

Communications subsystem 924 provides an interface to other computer systems and networks. Communications subsystem 924 serves as an interface for receiving data from and transmitting data to other systems from computer system 900. For example, communications subsystem 924 may enable computer system 900 to connect to one or more devices via the Internet. In some embodiments communications subsystem 924 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof)), global positioning system (GPS) receiver components, and/or other components. In some embodiments communications subsystem 924 can provide wired network connectivity (e.g., Ethernet) in addition to or instead of a wireless interface.

In some embodiments, communications subsystem 924 may also receive input communication in the form of structured and/or unstructured data feeds 926, event streams 928, event updates 930, and the like on behalf of one or more users who may use computer system 900.

By way of example, communications subsystem 924 may be configured to receive data feeds 926 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 924 may also be configured to receive data in the form of continuous data streams, which may include event streams 928 of real-time events and/or event updates 930, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 924 may also be configured to output the structured and/or unstructured data feeds 926, event streams 928, event updates 930, and the like to one or more databases that may be in communication with one or more streaming data source computers coupled to computer system 900.

Computer system 900 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 900 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or services are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments, and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method, comprising:
generating, by a computing system, a first-type identity and access (IA) service request for a randomly selected client cloud service of a set of client cloud services of different types provided by a cloud service provider (CSP), the first-type IA service request generated periodically according to a regular time interval;
monitoring, by the computing system, health of an identity management service that comprises a set of identity service cells, the monitoring comprising sending the first-type identity and access (IA) service request to one of the set of identity service cells;
creating, by the computing system, routing information associated with a first client cloud service and a first identity service cell of the set of identity service cells, the first client cloud service being one of the set of client cloud services provided by the cloud service provider (CSP);
updating, by the computing system, the routing information to generate updated routing information based at least in part on the monitored health of the identity management service; and
routing, by the computing system, a second-type IA service request by the first client cloud service to a first identity service cell of the set of identity service cells based at least in part on the updated routing information associated with the first client cloud service and the first identity service cell of the set of identity service cells, wherein the updated routing information is updated based at least in part on at least one of a workflow type or a capacity utilization rate threshold.

2. The method of claim 1, wherein sending the first-type IA service request to one of the set of identity service cells and routing the second-type IA service request are performed in parallel.

3. The method of claim 1, wherein each of the set of identity service cells comprises at least a host machine.

4. The method of claim 1, wherein the regular time interval is configured for identifying traffic changes.

5. The method of claim 4, wherein the first-type IA service request for the randomly selected client cloud service invokes a response from the identity management service without performing an identity management function for the randomly selected client cloud service.

6. The method of claim 1, wherein the second-type IA service request by the first client cloud service invokes a response from the identity management service and an identity management function for the first client cloud service.

7. The method of claim 1, wherein the updated routing information associated with the first client cloud service and the first identity service cell of the set of identity service cells is a mapping between the first client cloud service and a service endpoint of the first identity service cell.

8. The method of claim 7, wherein the updated routing information further comprising a mapping between the first client cloud service and a service endpoint of a second identity service cell of the set of identity service cells.

9. The method of claim 8, further comprising routing the second-type IA service request by the first client cloud service to a second service cell of the set of identity service cells instead when the first identity service cell is determined to be in an unhealthy condition.

10. The method of claim 1, wherein the updated routing information further comprising one or more attributes related to the health of the first identity service cell of the set of identity service cells.

11. The method of claim 10, wherein the one or more attributes comprises at least one of a utilization rate threshold, and an identity management function.

12. The method of claim 1, wherein the updated routing information is updated by following a configurable priority scheme.

13. A non-transitory computer-readable medium storing computer-executable instructions that, when executed by one or more processors of a computing system, cause the one or more processors to perform operations comprising:

generating, by the computing system, a first-type identity and access (IA) service request for a randomly selected client cloud service of a set of client cloud services of different types provided by a cloud service provider (CSP), the first-type IA service request generated periodically according to a regular time interval;

monitoring, by the computing system, health of an identity management service that comprises a set of identity service cells, the monitoring comprising sending the first-type identity and access (IA) service request to one of the set of identity service cells;

creating, by the computing system, routing information associated with a first client cloud service and a first identity service cell of the set of identity service cells, the first client cloud service being one of the set of client cloud services provided by the cloud service provider (CSP);

updating, by the computing system, the routing information to generate updated routing information, based at least in part on the monitored health of the identity management service and by following a configurable priority scheme; and routing, by the computing system, a second-type IA service request by the first client cloud service to a first identity service cell of the set of identity service cells based at least in part on the updated routing information associated with the first client cloud service and the first identity service cell of the set of identity service cells, wherein the updated routing information is updated based at least in part on at least one of a workflow type or a capacity utilization rate threshold.

14. The non-transitory computer-readable medium of claim 13, wherein the regular time interval is configured for identifying traffic changes.

15. The non-transitory computer-readable medium of claim 13, wherein the second-type IA service request by the first client cloud service invokes a response from the identity management service and an identity management function for the first client cloud service.

16. The non-transitory computer-readable medium of claim 13, wherein the routing information associated with the first client cloud service and the first identity service cell of the set of identity service cells is a mapping between the first client cloud service and a service endpoint of the first identity service cell; and wherein the updated routing information further comprises a mapping between the first client cloud service and a service endpoint of a second identity service cell of the set of identity service cells.

17. A computing system, comprising:

one or more processors; and one or more non-transitory computer readable media storing computer-executable instructions that, when executed by the one or more processors of a computing system, cause the system to:

generating, by the computing system, a first-type identity and access (IA) service request for a randomly selected client cloud service of a set of client cloud services of different types provided by a cloud service provider (CSP), the first-type IA service request generated periodically according to a regular time interval;

monitoring, by the computing system, health of an identity management service that comprises a set of identity service cells, the monitoring comprising sending the first-type identity and access (IA) service request to one of the set of identity service cells;

creating, by the computing system, routing information associated with a first client cloud service and a first identity service cell of the set of identity service cells, the first client cloud service being one of the set of client cloud services provided by the cloud service provider (CSP);

update, by the computing system, the routing information to generate updated routing information, based at least in part on the monitored health of the identity management service and by following a configurable priority scheme; and route, by the computing system, a second-type IA service request by the first client cloud service to a first identity service cell of the set of identity service cells based at least in part on the updated routing information associated with the first client cloud service and the first identity service cell of the set of identity service cells, wherein the updated routing information is updated based at least in part on at least one of a workflow type or a capacity utilization rate threshold.

18. The system of claim 17, wherein wherein the regular time interval is configured for identifying traffic changes.

19. The system of claim 17, wherein the second-type IA service request by the first client cloud service invokes a response from the identity management service and an identity management function for the first client cloud service.

20. The system of claim 17, wherein the routing information associated with the first client cloud service and the first identity service cell of the set of identity service cells is a mapping between the first client cloud service and a service endpoint of the first identity service cell; and wherein the updated routing information further comprises a mapping between the first client cloud service and a service endpoint of a second identity service cell of the set of identity service cells.

* * * * *